Figure 1:
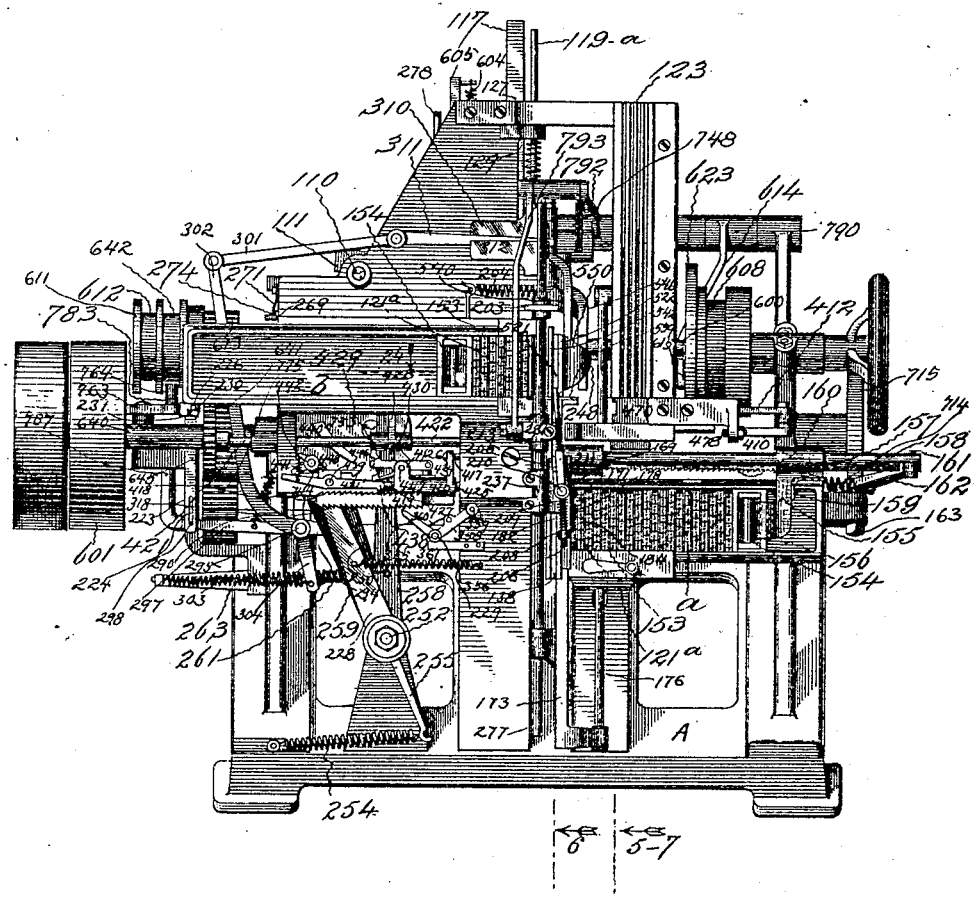

No. 844,563. PATENTED FEB. 19, 1907.
B. M. DES JARDINS.
TYPE JUSTIFYING MACHINE.
APPLICATION FILED JUNE 4, 1898.

15 SHEETS—SHEET 1.

Witnesses:
Eva S. Shelton
C. E. Buckland

Inventor:
Benj. M. Des Jardins

No. 844,563. PATENTED FEB. 19, 1907.
B. M. DES JARDINS.
TYPE JUSTIFYING MACHINE.
APPLICATION FILED JUNE 4, 1898.

15 SHEETS—SHEET 2.

Witnesses:
Eva S. Shelton.
C. E. Buckland.

Inventor:
Benj. M. DesJardins

No. 844,563. PATENTED FEB. 19, 1907.
B. M. DES JARDINS.
TYPE JUSTIFYING MACHINE.
APPLICATION FILED JUNE 4, 1898.

15 SHEETS—SHEET 3.

Witnesses:
Eva S. Shelton.
C. E. Buckland.

Inventor:
Benj. M. DesJardins

No. 844,563. PATENTED FEB. 19, 1907.
B. M. DES JARDINS.
TYPE JUSTIFYING MACHINE.
APPLICATION FILED JUNE 4, 1898.

15 SHEETS—SHEET 4.

Fig. 4

Witnesses:
Eva S. Shelton.
C. E. Buckland.

Inventor:
Benj. M. Des Jardins

No. 844,563. PATENTED FEB. 19, 1907.
B. M. DES JARDINS.
TYPE JUSTIFYING MACHINE.
APPLICATION FILED JUNE 4, 1898.

15 SHEETS—SHEET 5.

Witnesses:
Eva S. Shelton.
C. E. Buckland.

Inventor:
Benj. M. Des Jardins

No. 844,563. PATENTED FEB. 19, 1907.
B. M. DES JARDINS.
TYPE JUSTIFYING MACHINE.
APPLICATION FILED JUNE 4, 1898.

15 SHEETS—SHEET 6.

Witnesses:
Eva S. Shelton
C. E. Buckland

Inventor:
Benj. M. Desjardins

No. 844,563. PATENTED FEB. 19, 1907.
B. M. DES JARDINS.
TYPE JUSTIFYING MACHINE.
APPLICATION FILED JUNE 4, 1898.

15 SHEETS—SHEET 7.

Witnesses:
Eva S. Shelton.
C. E. Buckland.

Inventor:
Benj. M. Des Jardins

No. 844,563. PATENTED FEB. 19, 1907.
B. M. DES JARDINS.
TYPE JUSTIFYING MACHINE.
APPLICATION FILED JUNE 4, 1898.

15 SHEETS—SHEET 9.

Witnesses:
Eva S. Shelton
C. E. Buckland

Inventor:
Benj. M. DesJardins

No. 844,563. PATENTED FEB. 19, 1907.
B. M. DES JARDINS.
TYPE JUSTIFYING MACHINE.
APPLICATION FILED JUNE 4, 1898.
15 SHEETS—SHEET 10.
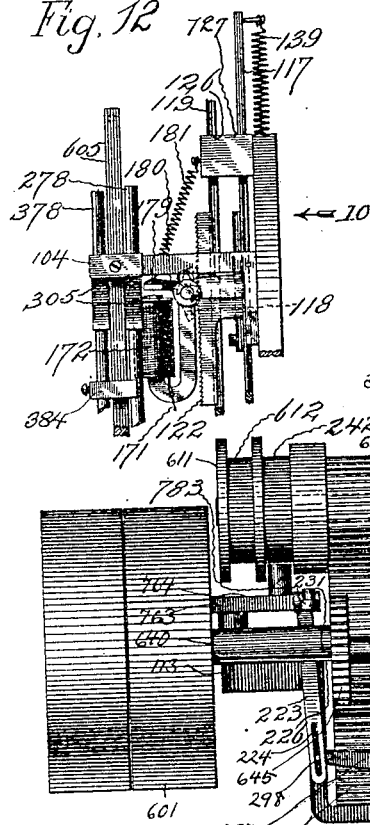
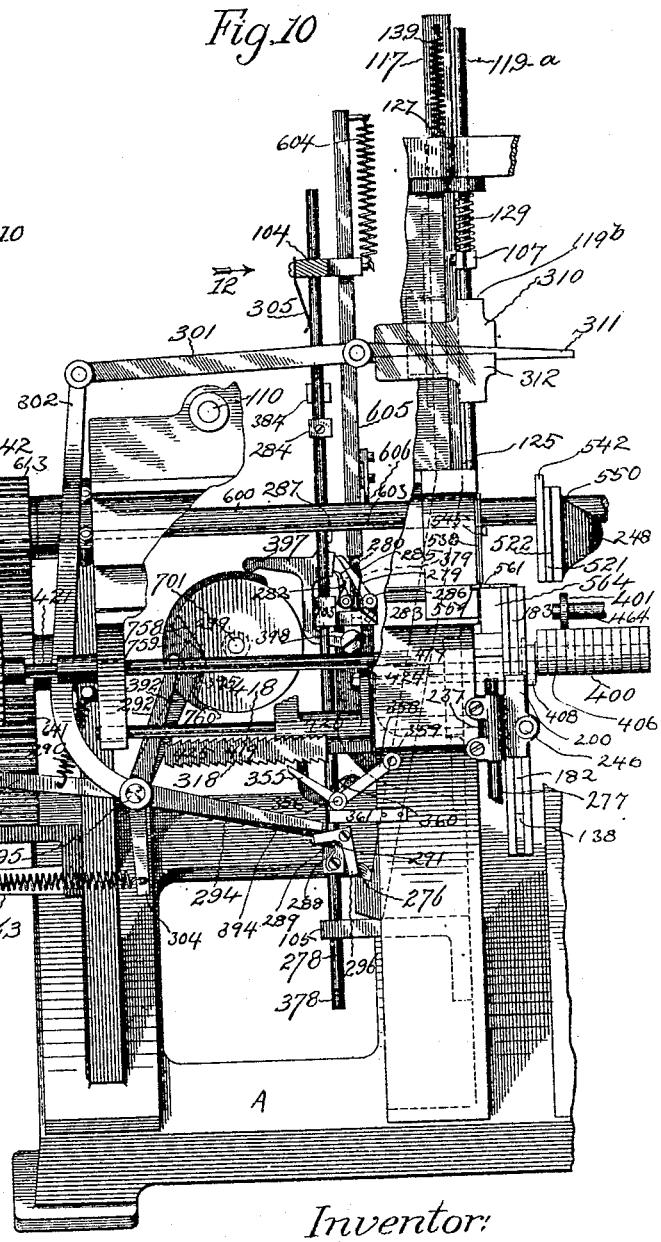
Witnesses:
Eva S. Shelton.
C. E. Buckland.
Inventor:
Benj. M. DesJardins

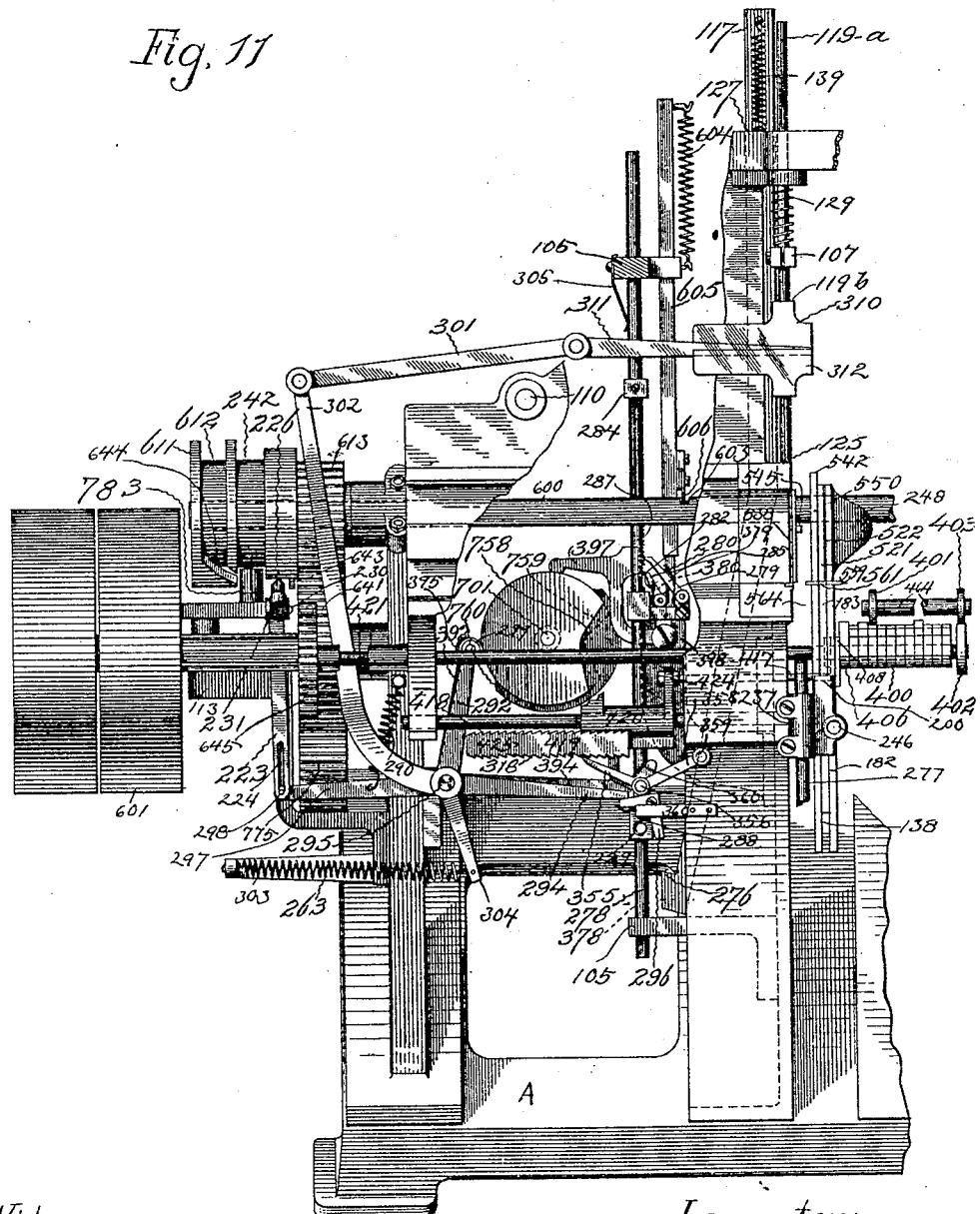

No. 844,563. PATENTED FEB. 19, 1907.
B. M. DES JARDINS.
TYPE JUSTIFYING MACHINE.
APPLICATION FILED JUNE 4, 1898.

15 SHEETS—SHEET 12.

Witnesses:
Eva S. Shelton.
C. E. Buckland.

Inventor:
Benj. M. Desjardins

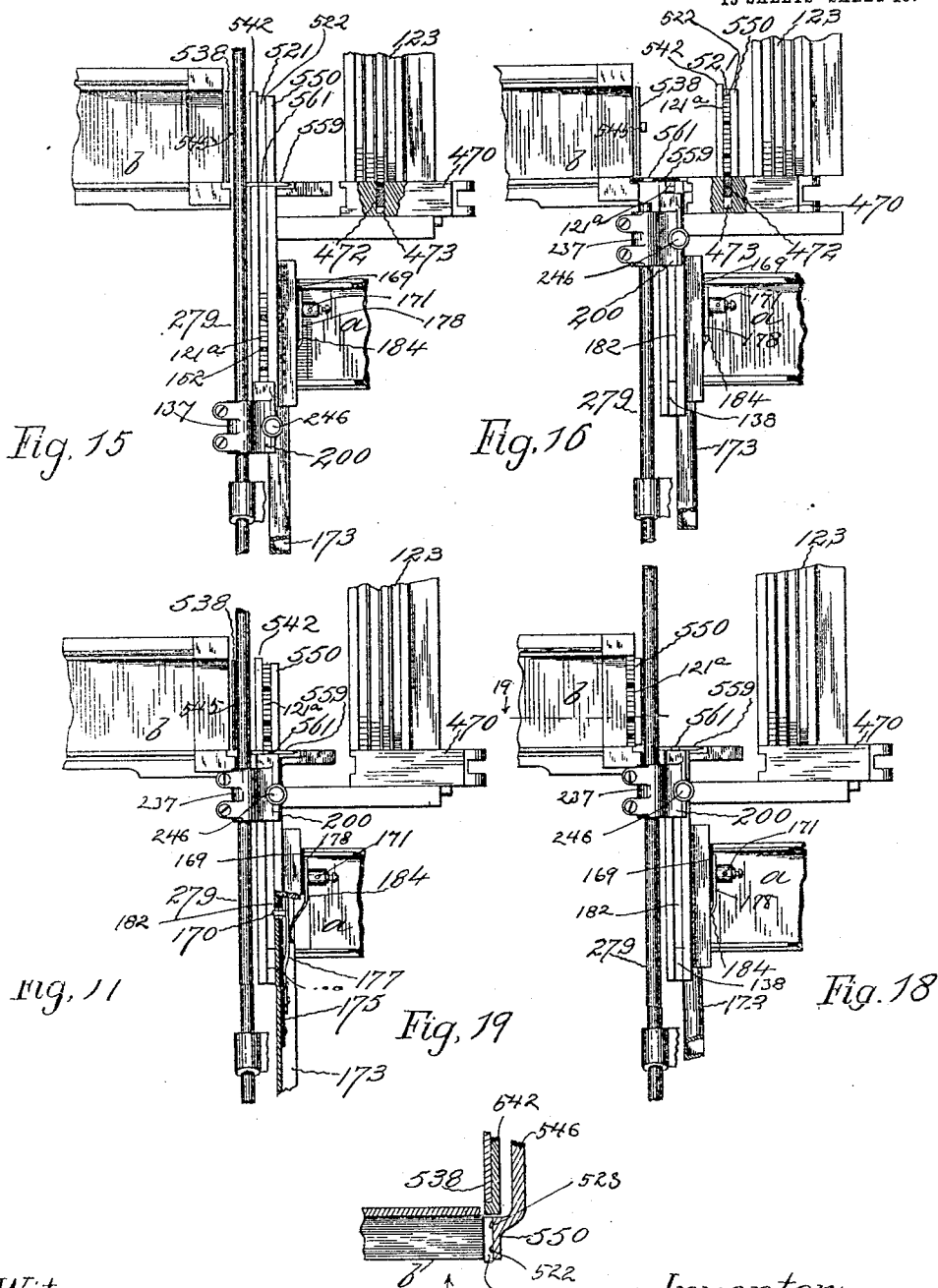

No. 844,563. PATENTED FEB. 19, 1907.
B. M. DES JARDINS.
TYPE JUSTIFYING MACHINE.
APPLICATION FILED JUNE 4, 1898.
15 SHEETS—SHEET 14.
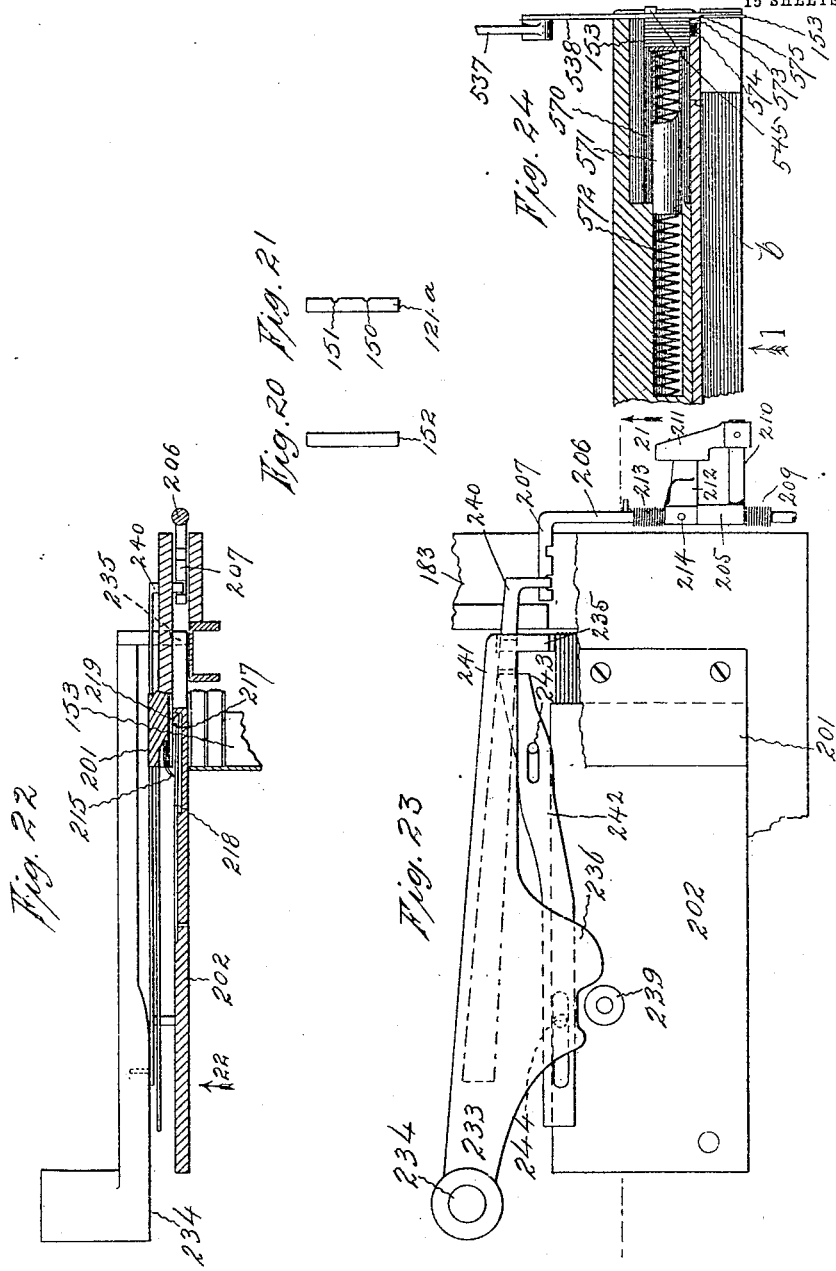

No. 844,563. PATENTED FEB. 19, 1907.
B. M. DES JARDINS.
TYPE JUSTIFYING MACHINE.
APPLICATION FILED JUNE 4, 1898.

15 SHEETS—SHEET 15.

Witnesses:

Inventor:
Benjamin M. Des Jardins
By Philip Sawyer Rice & Kennedy
Attorneys

UNITED STATES PATENT OFFICE.

BENJAMIN M. DES JARDINS, OF HARTFORD, CONNECTICUT, ASSIGNOR, BY MESNE ASSIGNMENTS, TO THE UNITYPE COMPANY, A CORPORATION OF NEW JERSEY.

TYPE-JUSTIFYING MACHINE.

No. 844,563.  Specification of Letters Patent.  Patented Feb. 19, 1907.

Application filed June 4, 1898. Serial No. 682,856.

*To all whom it may concern:*

Be it known that I, BENJAMIN M. DES JARDINS, a citizen of the United States, residing at Hartford, in the county of Hartford and State of Connecticut, have invented a new and useful Type-Justifying Machine, of which the following is a specification.

The improvement relates to type-justifying machines, and consists of improved and suitable automatic mechanism incidental to the various requirements necessary to compute and justify incomplete lines of type and properly arrange them in a column on a receiving-galley.

The herein-described embodiment of my invention relates to improved automatic mechanism whereby the main computing or dividing instrument employed is supplemented by a gage to determine the number of units in the remainder. After the line has been divided into as many parts as there are spaces required and the resultant member of the instrument has located approximately the largest size of available space values which may be inserted therein the remainder-gage is used to determine the amount left over from the first process of division. This action of the gage operatively reduces the amount of that remainder into a given number of parts, which are made mechanically available by the automatic mechanism employed to introduce the required combination of spaces into the line. In this particular embodiment of my invention the remainder devices are made in a more simple manner than I have heretofore been able to do it to represent and determine the total number of space differences or units necessary to fill out the deficiency which would remain if the line was justified from the smaller of the two neighboring sizes between which the quotient-indicator of the division happens to fall. The improvement particularly provides simple and direct operative means whereby the deficiency is satisfied by employing a due proportion of each of the two neighboring space values first indicated.

The invention further consists of other devices incidental to putting the main improvement into a more efficient and simplified organized mechanical structure for the purpose of carrying out the automatic performances incidental thereto. Among such improvements are the more mechanical constructions of the two similar controlling mechanisms— the one for engaging the remainder, whereby it may be mechanically operated upon at the time predetermined for changing from one size of spaces to another, and the other for the purpose of directing the machine in its irregular intermittent line actions during the operation of handling the words and spaces. The invention also comprises improved means whereby the main and the remainder computations may be transmitted for directing the necessary automatic operations.

In my improvement the lines of type are first set with thin separators between the words, which preferably do not project beyond the regular outline of the type-body, with the regular thin separating brass rules usually employed by printers between said lines to protect the uneven ends thereof, leaving the column of composed matter in fair condition to be clamped and have the regular proof taken therefrom. This column is then placed on the machine and automatically pushed forward until the first line with its separating rule is engaged by the line-handling mechanism therein. Said line is removed from its position between the two supporting-rules, clamped against a fixed abutment, and the places for spaces or the separators counted. The clamping of the line determines the exact length thereof, including the temporary separators, while the counting of the said separators determines the number of spaces required. The main computing instrument then calculates the difference between the separators used and the actual size of the spaces which would be required if the machine was provided with an infinite number having infinitesimal differences. A suitable index indicates boldly what the spaces are with which the machine is provided and is also made to communicate in a special manner all the intervening possible sizes. The machine having determined upon these two resultants, the quotient of the shortage by the number of spaces and the number of space units contained in the remainder, then proceeds to remove the original dividing spaces or separators, inserting the required value in the places thereof. The difference-controller determines the time when the operation upon one size of spaces is changed to a similar operation on the neighboring size, and the clutch-controller determines the length of time the automatic line mechanism shall be suspended during the handling of each line to compensate for different numbers of spaces in different lines.

The improvement further comprises positively-operated devices for combining spaces to make up the requisite values and for inserting them into the incoming type-line, and also consists of simplified means for depositing the line in the receiving-galley after the justification is effected and introducing the leads into the type-column.

That my invention may be seen and fully understood by others, reference will be had to the following specification and annexed drawings, forming a part thereof, in which—

Figure 2:
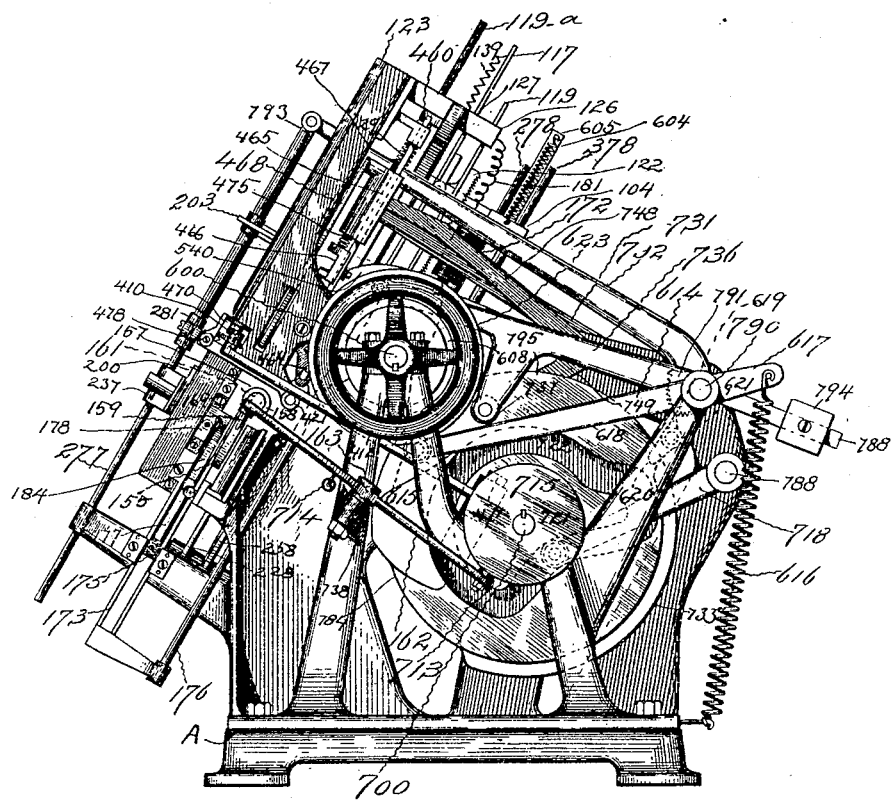
Figure 3:
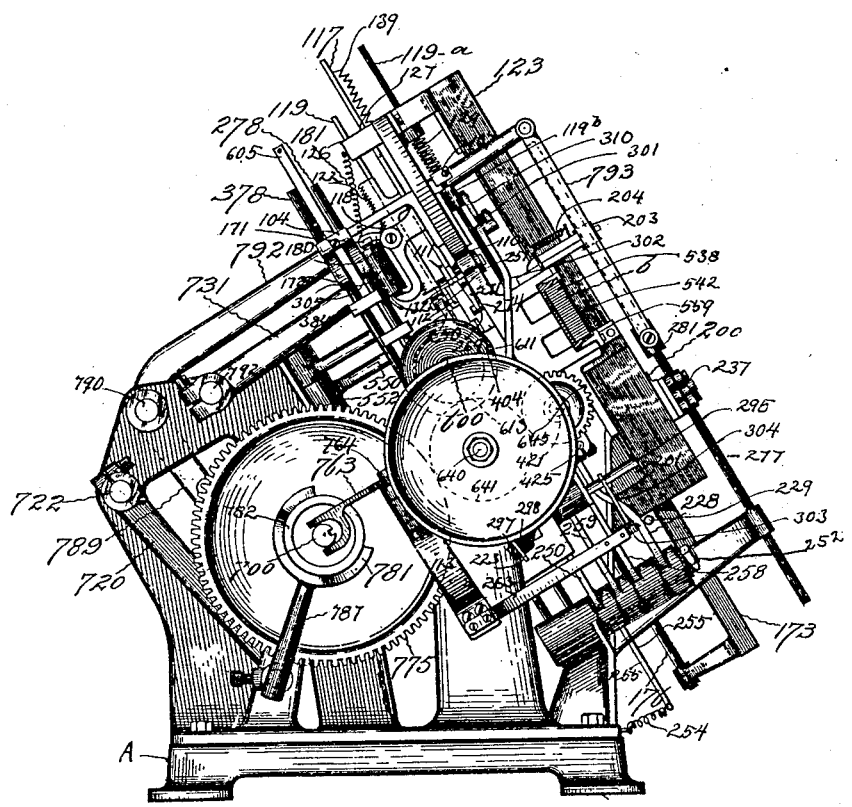
Figure 5:
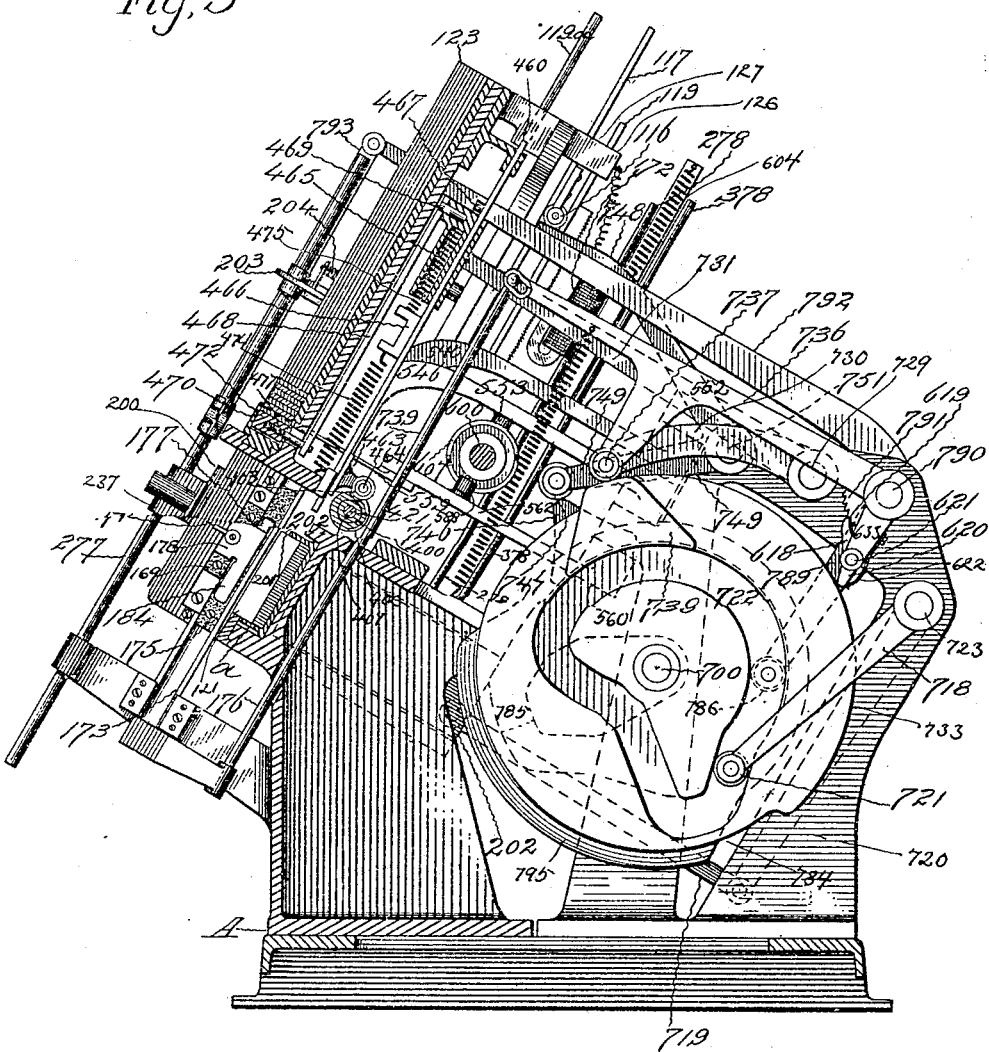
Figure 6:
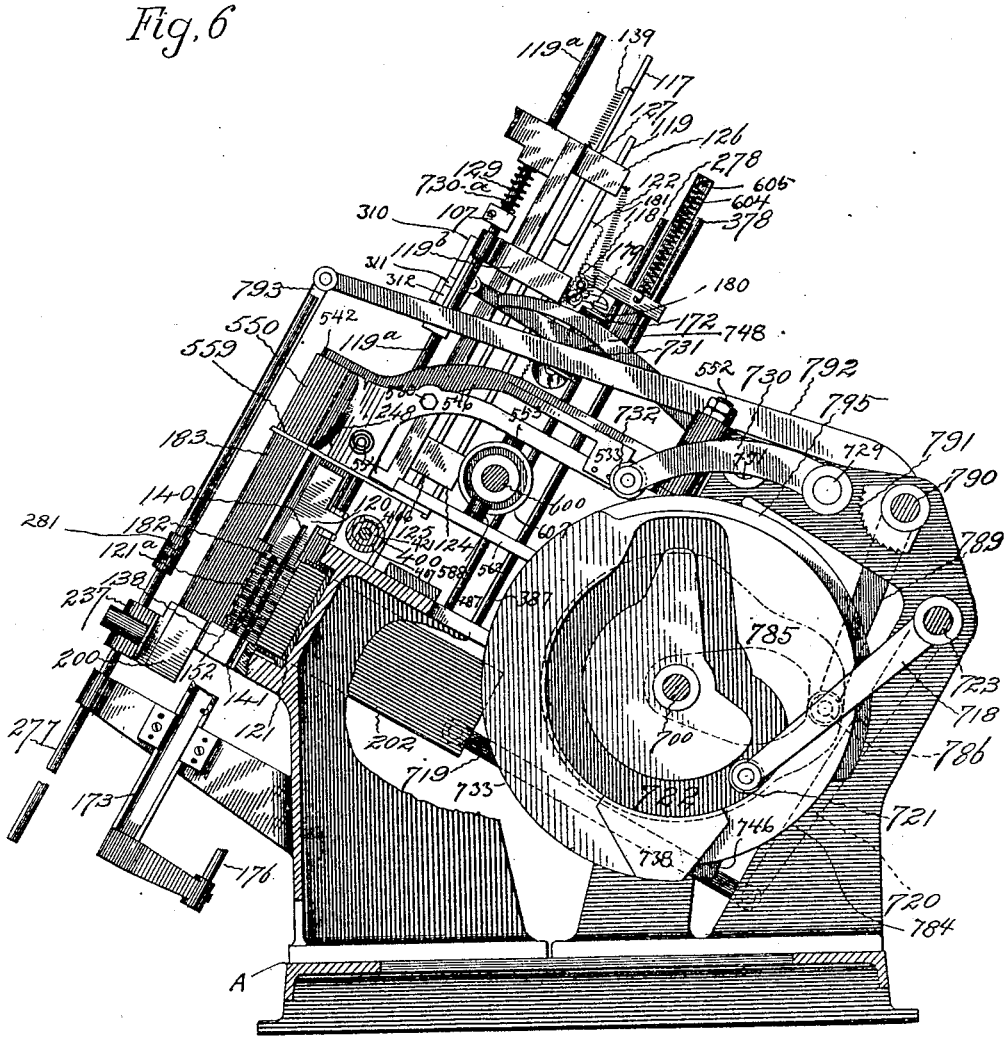
Figure 7:
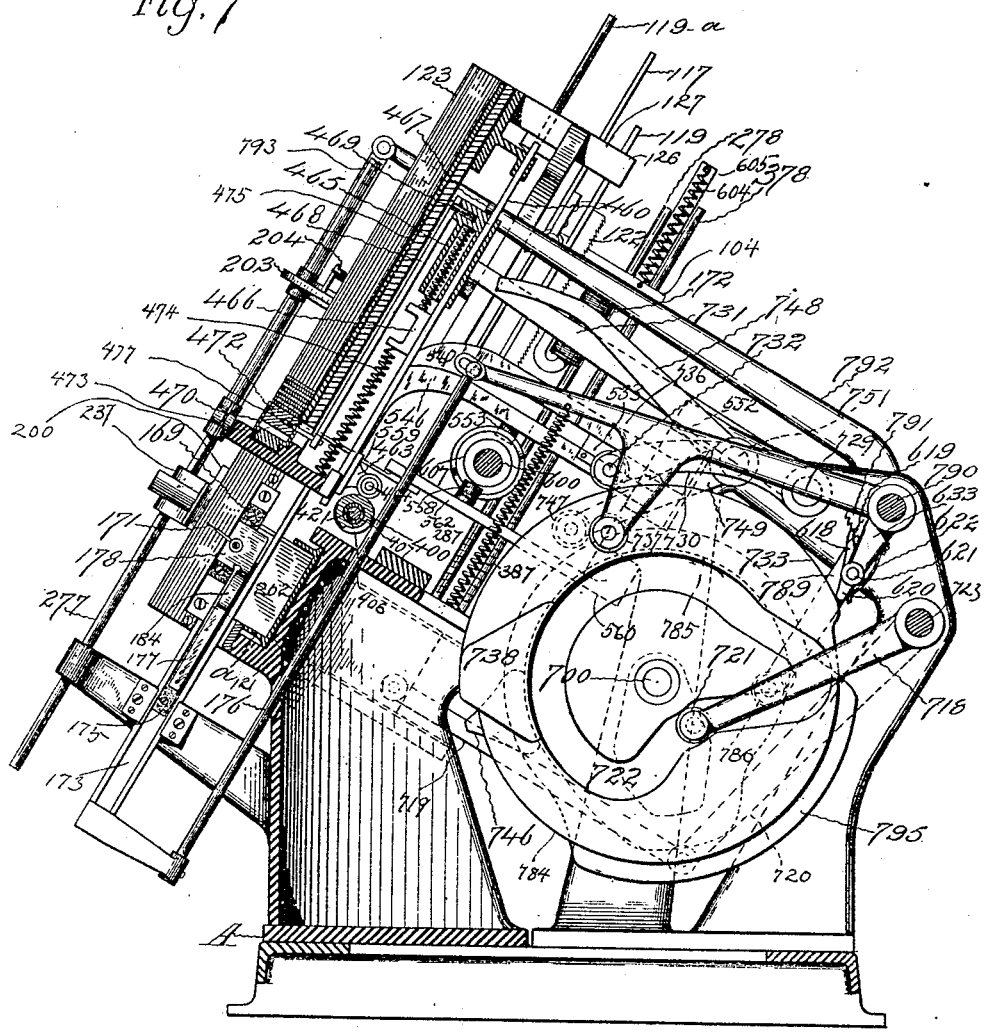
Figure 8:
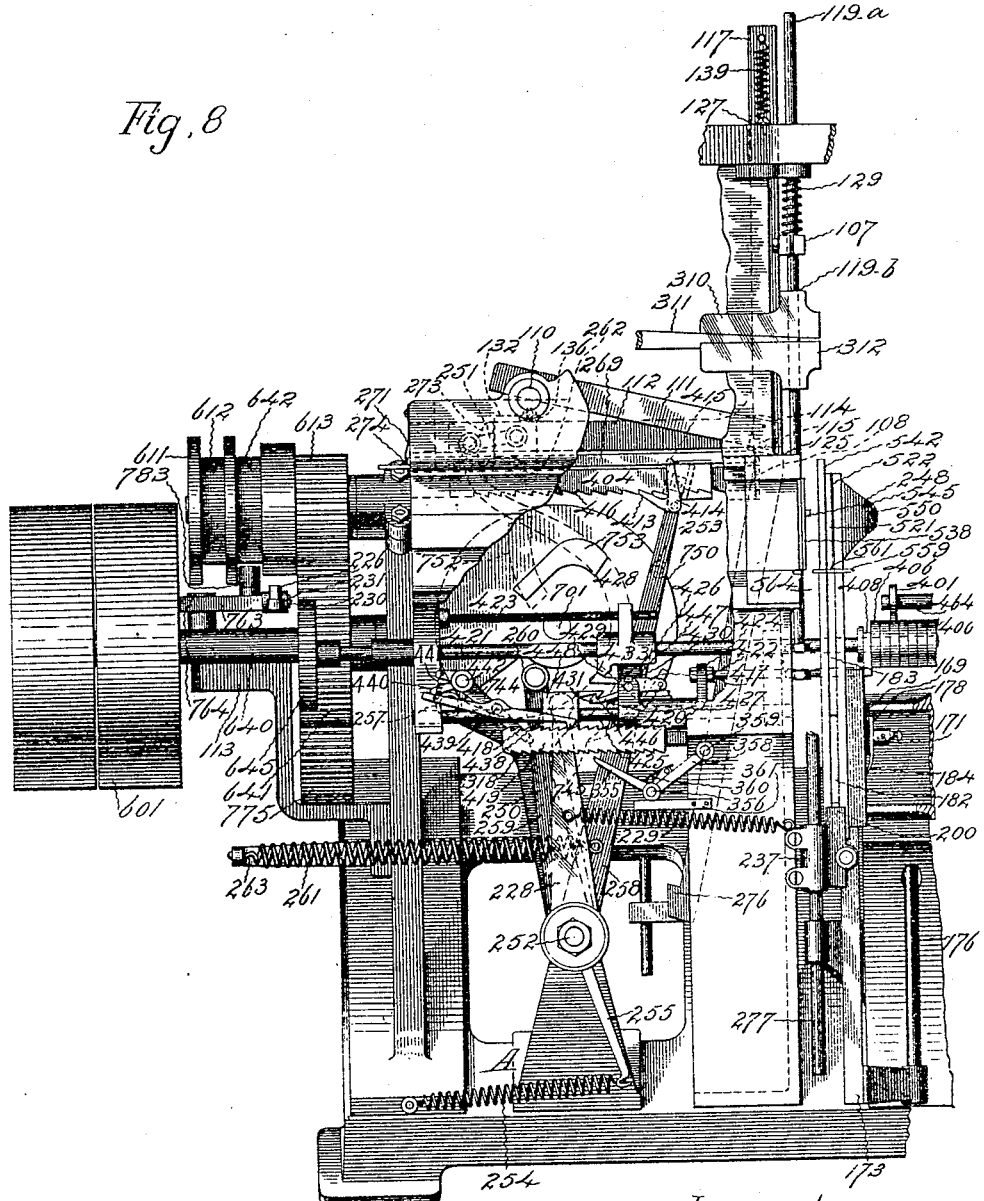
Figure 9:
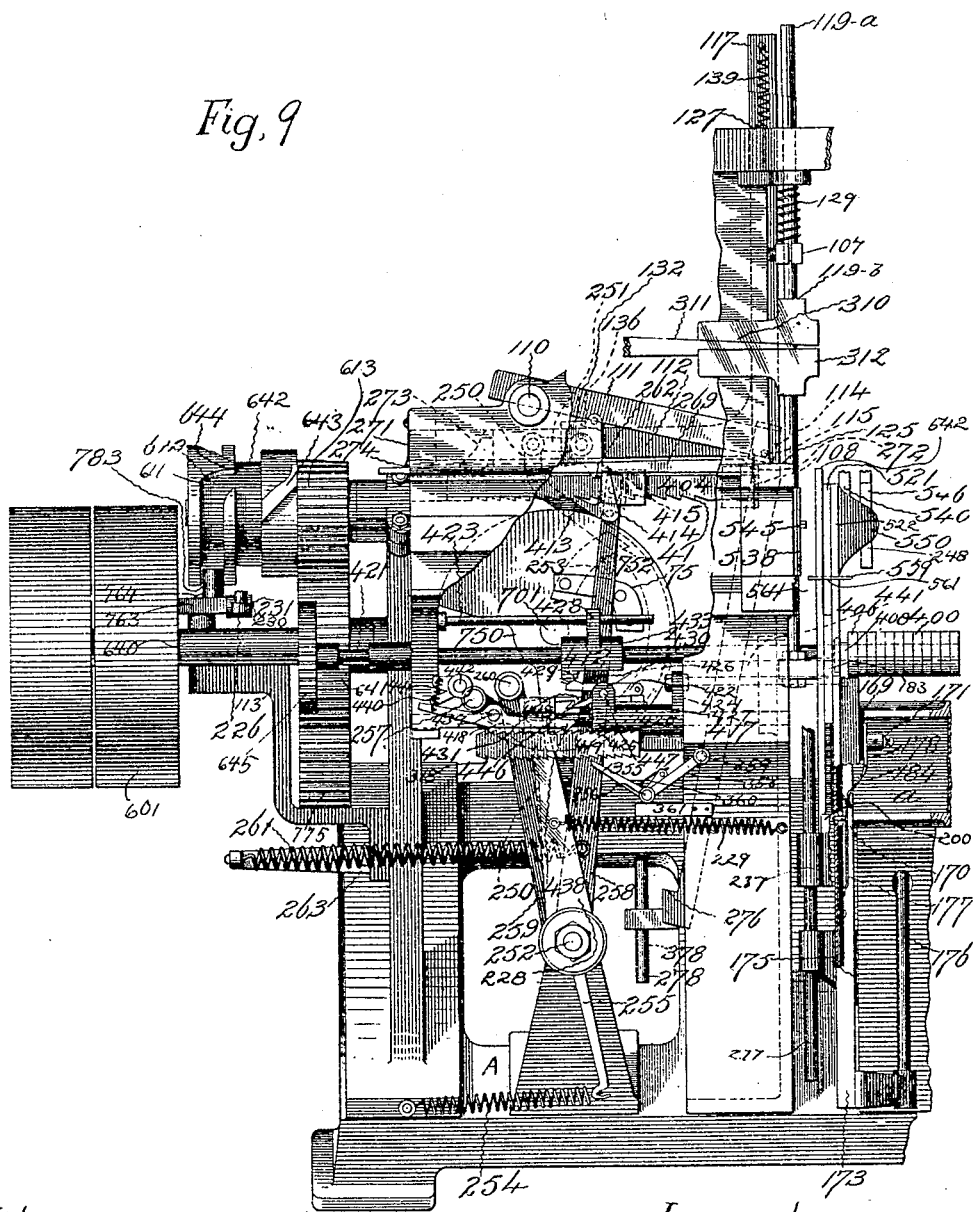
Figure 13:
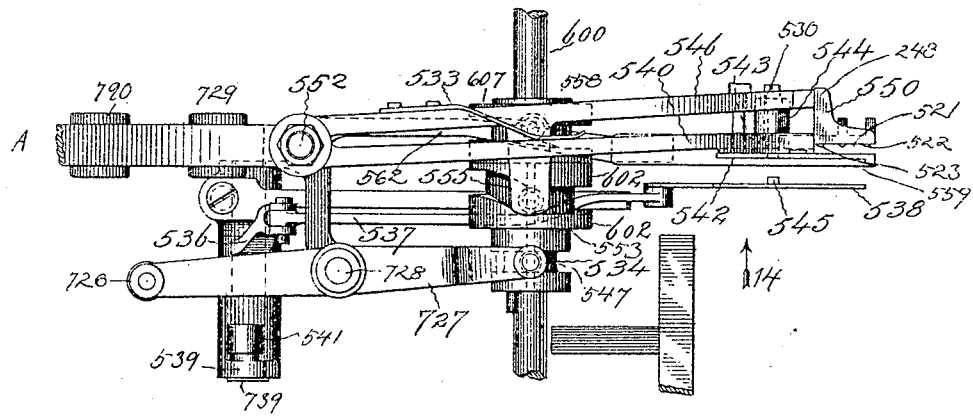
Figure 14:
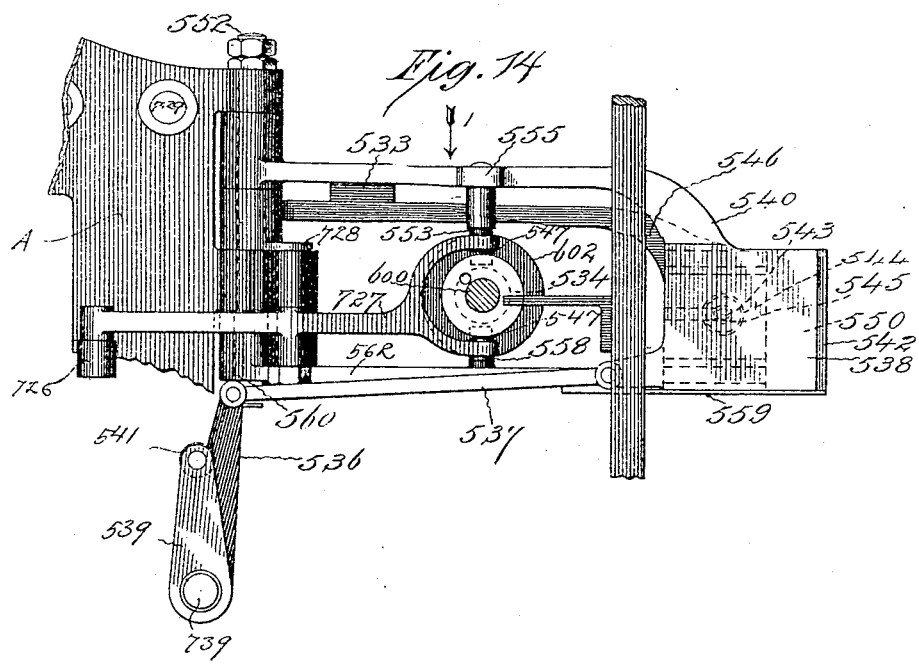
Figure 25:
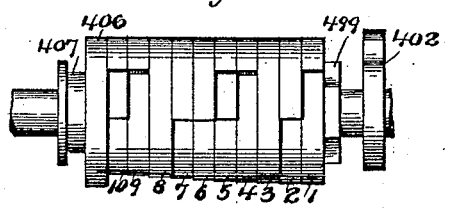
Figure 27:
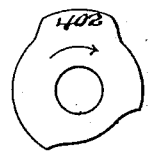
Figure 26:
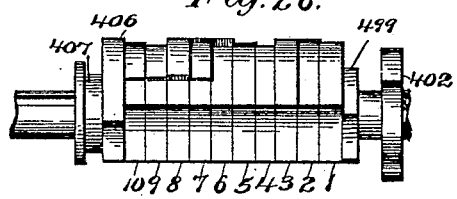
Figure 28:
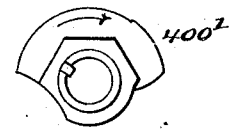
Figure 29:
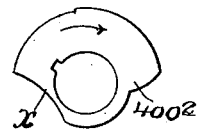
Figure 30:
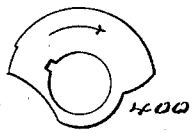
Figure 31:
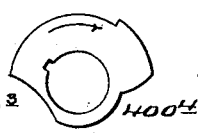
Figure 32:
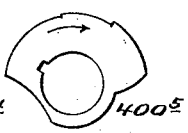
Figure 33:
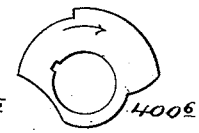
Figure 34:
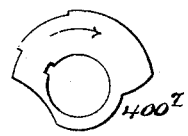
Figure 35:
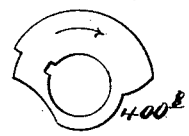
Figure 36:
Figure 37:
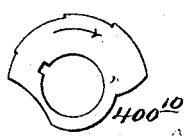

Figure 1 is a front elevation of my machine; Fig. 2, a right end elevation of said machine; Fig. 3, a left end elevation of the same; Fig. 4, a plan view; Fig. 5, a transverse vertical section looking in the direction of the arrow 5, Figs. 1 and 4 showing the positions of the cams as the line leaves the plane of the feed-galley; Fig. 6, a transverse vertical section looking in the direction of the arrow 6, Figs. 1 and 4, showing the positions of said cams after the operation of the computing devices takes place; Fig. 7, a view similar to the two previous ones, showing the positions of said cams at the beginning of the line-feeding operation; Fig. 8, a front operative view of a part of said machine, showing the starting positions of the members belonging to the main computing device; Fig. 9, a front operative view of the members belonging to said computing device, showing their positions after the measurement has been taken; Fig. 10, a front operative view showing the parts belonging to the remainder or difference and clutch-controlling devices, at their starting positions; Fig. 11, a front operative view of the controlling devices, showing their positions at the instant of the performance of their work; Fig. 12, a detached left side view of portions of the electrocounting mechanism; Fig. 13, an enlarged detached plan view of the line-receiving and galley-feed mechanism; Fig. 14, a left elevation of said mechanism, enlarged and detached; Fig. 15, a detached front view of the channels between the two galleys and of the space-collector, showing the latter in the act of receiving spaces from the space-channels; Fig. 16, a similar view to the previous one, showing said collector in the act of discharging a space value into the cut-off channel; Fig. 17, a view of the above-mentioned parts, showing the position and condition of the cut-off or galley-feed channel just prior to the transfer of the line onto the receiving-galley, also a section view of portions of the electrocounting mechanism; Fig. 18, a similar view showing the justified line on said galley and the position of the channel member which transferred said line; Fig. 19, a horizontal sectional view of the galley-feed channel members at the instant of discharging the line in the direction of the arrow 19, Fig. 18; Fig. 20, a side view of a separator without nicks; Fig. 21, a side view of a type-body with nicks; Fig. 22, a bottom view and partial section of the rule or lead distributer and the line-clamping members in the direction of the arrow 22, Fig. 23; Fig. 23, a left side view of the same; and Fig. 24, a horizontal sectional view of the rule-feed or lead-inserting device looking in the direction of the arrow 24, Fig. 1; Fig. 25, a side view of the forms detached from the machine; Fig. 26, a side view of the forms on a different line; Fig. 27, a detail view of the cam carried by the form-shaft; Fig. 28 to Fig. 38, inclusive, detail views of the separate forms.

Similar letters and figures of reference designate like parts in the drawings and specification.

In practice the machine is inclined backward at a suitable angle to handle loose type-lines; but for the sake of convenience in the description and the front views in the drawings it is referred to and shown as standing in a vertical position. As far as practicable the description will follow the type-line in the order of its travel from one galley to the other. The fact is to be kept in mind that the machine simultaneously acts upon two lines at a time—that is, the column is moved along the lower galley, a type-line is thrust forward, engaged, and the calculating devices adjusted while the spaces are being inserted in the preceding line.

As far as practicable the reference-numerals herein employed conform to the following order or arrangement, the numbers for the different grand divisions being taken from each one hundred figures respectively employed: The figures employed which are below 100 are the numbers in the drawings used in connection with the direction-indicating arrows, and broken lines are employed with said numbers and arrows to show approximately at what part of the figures the correlative figures or parts are taken, the reference-numbers being ample to identify the parts shown. The figures employed from the first one hundred numbers above 100 refer generally to the primary measuring elements accompanying type-engaging parts and other miscellaneous mechanism, those above and including 200 to the difference devices and accompanying parts, above and including 300 to the space-dislodging mechanism and parts relating thereto, above and including 400 to the mechanism which feeds the spaces into the line and such word-handling mechanism as is closely related thereto, above and including 500 to the separator-handling mechanism and allied parts, above and including 600 to the automatic word-actuating mechanism and parts relating thereto, and above and including 700 to the automatic line-actuating mechanism. It is understood that the several members of this machine are suitably journaled to or otherwise mounted in the frame A, in all cases not specifically provided for. The word-shaft 600 is driven by a belt (not shown) around the pulley 601.

The lower galley $a$ contains the unjustified lines of type 121$^a$, Fig. 1, the bodies of type contained therein having the regular foundry-nicks 150 and 151, Fig. 21. The words in the galley $a$ are separated by the plain metallic separators 152, Fig. 20, which are of the same size as the type-body, but having edges without any nicks corresponding to said foundry-nicks of the type. The loose uneven type-lines are separated from each other by the regular printers' leads or brasses, herein termed "separating-rules" 153 to distinguish them from the separators 152.

The galley friction-blocks 154, such as are ordinarily used in type-setting machines, are inserted against the unprotected ends of the column of type 121$^a$ in the galley $a$ and $b$. The column of unjustified type in the galley $a$ is moved to the left by the traveling pusher-arm 155. Said arm has its bifurcated projection 156 extending into the opening of the friction-block 154, locking it into operative engagement therewith and holding the two against any right or left displacement with reference to each other.

To move the column of type in the galley $a$ one line at a time, a longitudinally-movable column-feed ratchet-rod is employed, said rod being operatively connected to the traveling pusher-arm 155 and actuated intermittently by the line-shaft 700 through the medium of suitable connecting mechanism described below.

The column-feed traveling hub 157 of the arm 155 is mounted on the ratchet-rod 158, said hub being provided with the spring-actuated column-feed pawl 159, mounted in a slot opening in the bottom thereof and which is pivoted thereto. A spring is inserted between the left depending end of the pawl 159 and the side of said slot to keep the right engaging end of said pawl upward, and by means of this spring-actuated pawl said hub is operatively engaged by the ratchet-teeth 160 of the rod 158 during the left longitudinal motion of said rod. The ratchet-rod 158 has its slide-bearings in the middle and right end brackets of the frame A. It is provided with the projecting engaging pin 161, operatively engaged by the reciprocating column-feed arm 162, the latter being pivoted to the frame A by the stud 163, and through said arm said ratchet-rod is given a longitudinally-reciprocating motion. Said arm is provided with the cam projection 713, operatively engaging the surface cam 715 of the line-shaft 700, being pressed against its left face and into the depression 716 by means of the coiled spring 714, which has its rear end fastened to the frame A and its right end to the feed-arm 162. The movement of said ratchet-rod to the left causes one of the teeth 160 to engage the feed-pawl 159 of the traveling feed-arm 155 and push the column in the same direction until the first line of type is in an engaging position within the machine. When said ratchet-rod is returned to the right, it passes under the pawl 159 through the hub 157 without disturbing the arm 155 or the friction-block 154, said return motion also releasing the pressure from behind the column of type. A repetition of the movements above described takes place for each line of type, and a succession of actuating engagements follows the friction-block 154 wherever it may be. By means of the operation of the column-feed just described the left end unadjusted line of the column in the galley $a$ becomes located over the line-lifting plate 202, with the left separating-rule 153 against the column-feed-stop block 201, forming the left wall of the column-feed channel 121.

The line of type 121$^a$ being released from the tension of the column-feed device is now free to be moved forward by the lifting-plate 202 and then transferred into the channel 182, which is especially termed the "measuring-channel," where it is brought into engaging relation with the computing devices described further on. The line-lifting plate 202 has its slide-bearings in the central bracket of the frame A and starts with its forward edge in line with the bottom of the galley $a$, forming a continuation thereof, then serving as a suitable bottom for the column-feed channel 121. By being transferred forward the plate 202 forms a similar bottom for the measuring-channel 182 and again for the feed-channel 183. Said plate is operated through the medium of the connecting-rod 719, the operating-arm 720, and the supplemental operating-arm 718, which has its projection or roller 721 engaged by the grooved cam 722 on the line-shaft 700. The arms 720 and 718 are pivoted at 723 to the frame A.

In order to obviate the displacement by turning of the upper character of the type-line when the gage 120 is removed therefrom upon the completion of the operation of the computing devices and to securely hold said line in a compact form during its entire upward travel, I employ the mechanism described below to clamp the same.

The clamping-arm 233 is pivoted at 234 to the frame A and projects forward with its contact end 235 offset to the right into the channel 182 through a slot in the left channel-wall. The cam-plate 236, extending below the arm 233, is adapted to be engaged by the roller 239 on the left side of the lifting-plate 202. On the right side of said arm is the resilient engaging finger 240, fast at its rear end thereto and passing through a suitable opening in the contact end 235. The hooked free terminal of said finger enters the channel 182 through another slot in the wall thereof and engages the hook 207. This finger is provided with the right incline 241. Between the plate 202 and the arm 233 is the throw-off bar 242, pivoted at 243 to the frame and connected to said plate by the pin 244, extending through a suitable slot in said bar. The pivot 243 also passes through a slot in the bar 242, the slots therein being necessary to give the required amount of play to said bar. The arm 233 is pressed downward into engagement with the roller 239 by a spring (not shown) affixed at its rear end to said frame.

The sleeve 205 is pivoted at 246 to the blade-mounting block 237, which slides up and down on the guide-rod 277, as elsewhere explained. The rod 206 operates through the sleeve 205 and is provided at the top with the rearwardly-extending hook 207, which plays in the various channels. Between the base of the sleeve 205 and the stop 208, fast to the rod 206, is interposed the spring 209. The stud 210 on the front of the sleeve 205 passes through the pivot-opening 246 in the block 237 and carries the finger 211 rigid therewith and engaged by the dog 212, sleeved on the rod 206 above said sleeve. The dog 212 and the hook 207 are normally retained in the same straight line by the spring 213, fastened at its upper end to the rod 206, and at its lower end to said dog and the pin 214, extending from said rod into a slot in the dog-sleeve. Said slot and the pin 214 allow a slight turn to be given to the rod 206 against the spring 213 when the hook 207 is moved to the left by a displacement of the upper channel in that direction. The spring 247 encircles the stud 210, being attached at opposite ends to the finger 211 and the block 237, respectively, and serves to normally rock said pin with attached parts to the left; but said parts are actuated in the opposite direction against the resiliency of said spring when the hook 207 passes out of the channel 521.

In operation the arm 233 is elevated by the roller 239 as the plate 202 is thrust forward to admit the type-line beneath the end 235, the rod 206 being drawn upward against the spring 309 at the same time. When the roller 239 gets by the rear projection on the cam 236, the spring 245 forces the end 235 down onto said line and securely clamps the latter between itself and the block 138. The end 235 comes in contact with the line in front of the gage 120, so as not to interfere therewith. After said gage has been removed the plate 202 advances the type-line into a position below the channel 183, at the same time carrying it between the hook 207 and the blade 200, where it continues to be securely held through the medium of the rod 206 and the spring 209. As the plate 202 moves forward to transfer the type-line from the channel 182 to the channel 183 the roller 239 encounters the forward projection on the cam-plate 236, and thereby raises the arm 233 and the hook 207 to provide a clear passage for said line. When the roller 239 clears the cam-plate 236, the hook 207 settles down onto the top of the line. The forward movement of the plate 202 has driven the bar 242 against the incline 241 and forced the finger 240 out of contact with the hook 207. The line is held by said blade and hook until the upper channel is reached, when the hook 207 passes out of the top thereof, down the camway 248 on the right side of the channel members, which have shifted their position, as will appear at the proper time, through the channel 183 to its former position in the channel 182 on top of the finger 240, the return of the plate 202 having released said finger. It will be understood that the movement of the sleeve 205, which carries the rod 206, is coincident with that of the blade 200, elsewhere detailed, since said sleeve and block are both secured to the block 137.

The rule-distributer is described as follows: On its left near the front end the lifting-plate 202 is provided with the rule-removing snap-hooks 217, the spring-shanks 218 of which keep them continually pressed to the left. During the first part of the forward travel of said lifting-plate the spring-hooks 217 are thrust inward by the contact of their incline 219 against the edge of the separating-rule 153, which lies against the stop-block 201 to the left of the type-line, said rule being retained in that position by the overhanging rear edge of the channel-wall. Said stop-block is screwed to the plate forming the left walls of the lower channels and can be adjusted right and left to compensate for different thicknesses of the separating-rules 153 which may be used. It has fastened thereon the detent-springs 215, the rear ends of which are offset to the right and lie in the path of the hooks 217, said path being in a plane beyond the right edge of said stop-block.

The operation of the line-lifting plate has been explained, and it will now be necessary to indicate the operations of the rule-distributer. The two divisions of the machine above designated—namely, the lifting-plate and the rule-distributer—are in a measure coördinate, and their purpose or use is to remove the rule from the type-line acted upon and to transfer said line into the measuring-channel. In the forward movement of the lifting-plate 202 the hooks 217 pass by the rule 153, which rests against the stop-block 201; but upon the return of said plate said hooks, which snap to the left over the front edge of said rule during the forward movement of said plate, carry the same backward beyond the detents 215 and allow it to drop clear of the machine into any suitable receptacle. The detents or springs 215 bear upon the rule while it is being actuated by the hooks 217 to prevent displacement of said rule during this last part of its travel.

The computing devices, into engagement with which the type-line is transferred when pushed forward into the measuring-channel 182 after leaving the column, will next be described.

The first step in the present mechanical operation consists in clamping the type-line in said channel by means of a gage which is automatically moved from a given starting-point into contiguity with the end of said line in the manner directly to be explained.

While the line of type 121$^a$ is held in the channel 182 it rests against the end of the lifting-plate 202 and upon the base of said channel, which consists of the abutment-block 138, a plate rigidly fastened to the frame A. The type-line-measuring gage 120 is rigid with the line-measuring slide-rod 119$^a$, which is fastened to the measuring-bar 119 by means of the connecting-block 119$^b$, Fig. 6. The rod 119$^a$ is suitably journaled to the middle bracket of the frame A. The bar 119 has a longitudinal movement in the boxes 124 and 126, fastened to the middle bracket of the frame A for a distance corresponding to the aggregate difference between the separators 152 and the spaces required to fill the type-line, and it is held with a constant downward tension by means of the coiled spring 129 on the rod 119$^a$, interposed between the upper bearing of said rod and the stop 107, fast thereto. Said line-measuring bar being supplemental to the measuring-gage 120 is necessarily provided with the projecting T-blade 112, described farther on.

The bar 119 through the medium of the rod 119$^a$, the clamping-arm 731, the extension 730, and the projection or roller 732 is operated against the action of the clamping-spring 129 by the surface cam 733 on the line-shaft 700. The arm 731 and extension 730 are pivoted at 729 to said middle bracket. The rotation of the cam 733, through the intervening mechanism, causes the gage 120 to be removed from the path of the advancing type-line on the plate 202 and to occupy its highest position, which is a little above the upper extremity of the required or total length of said line when justified to allow for measuring a line that must be shortened in order to be justified, as will appear more clearly hereinafter. After the line has been introduced into the channel 182 the turning of the cam 733 allows the spring 139 to draw the gage 120 down onto the top of said line, thereby clamping it. In changing position from its upper station to the end of the actual line the gage 120 travels a distance equal to the difference between the present separators and their displacing-spaces when said line is too short, said difference being the interval between the length of a justified line and that of the short one which is covered by said travel; but when the line is too long the distance left untraveled by said gage is equal to said difference. It will be understood from the foregoing that the gage 120 in its movement from the starting position to the end of a short line passes an imaginary point representing the required type-line length, and the distance traveled below that point constitutes the measurement, while for a line that is too long the distance untraveled above said point constitutes the measurement. The imaginary point referred to in the previous sentence has a real existence in the contact-block 136, as will be clearly shown hereinafter. As a rule the unjustified type-lines are too short, seldom too long, and the description generally applies to the former condition or line shortages; but the machine is equally capable of acting upon lines that are too long, as the previous statements indicate.

After the type-line has been clamped with jaws adjustable with reference to the length of said line in the holding device which agrees substantially in size with the height and width of type, all as elsewhere described, the counting mechanism comes into operation for determining the number of spaces required and supplying the divider for the quotient sought by automatically counting the intervals between the words in said line. Each separator corresponds substantially with the body of a type character, but must project at some one or more points beyond said body in order to afford a place of contact for the counting mechanism, which I will now proceed to describe and explain.

The electro-contact-point 170, the electro-conductors 171, and the electromagnets 172 are embraced in the counting mechanism, together with other parts about to be mentioned. The slide or support 173, which carries the contact-point 170 over the type-line, extends on the right side of the lifting-plate 202 and reciprocates in suitable boxes projected from the middle bracket of the frame A. The arm 736 is loose on the rock-shaft 790 and has its projection or roller 737 in engagement with the cam 738 on the line-shaft 700. Said arm through its connecting-rod 176 operates the support or slide 173. Said slide is movable in its bearings a distance slightly in excess of the length of the longest type-line which the machine is capable of handling. It is hollowed out somewhat in the form of the letter E to make room for the fiber plate 175, which insulates the yielding contact-plate 177, fastened on the outside thereof. Said contact-plate is also somewhat longer than the type-line.

The contact-spring 178 is fixed against the outside of the line-feed-channel wall and is split at one side to provide the integral projection 184. The projection 184 extends into the path of the yielding plate 177 in the slide 173 and is capable of pressing said plate slightly to the left. The electropoint 170 is secured to the center of the plate 177 and passes through a suitable opening in the insulation-plate 175 and the slide 173, extending a short distance beyond the latter into the measuring-line channel 182. Said point passes freely through the groove made by the foundry-nicks of the type, the groove 140 in the measuring-gage 120, and the groove 141 in the abutment-block 138. The cam 738 actuates said slide at the proper time through the intervening mechanism, causing it to move downward the full distance of its travel or a distance slightly in excess of the length of the type-line 121$^a$, the point 170 being provided with a perfectly clear passage, as explained above, except where it encounters the metallic separators 152, in passing over which an electrical contact is made. The resiliency of the spring projection 184 enables the point 170 to pass the separators 152 without unnecessary friction, but at the same time furnishing the right amount of energy for the proper electrical contact. The conducting contact-spring 178 is insulated from the machine by the fiber plate 169 and has connected therewith one of the conductor-wires 171. An electric battery (not shown in the drawings) has one pole connected directly to the frame of the machine and the other to the second conductor 171 from the magnets 172. The circuit over or through which the electrical current must pass from and to the battery every time said circuit is completed by the contact between the point 170 and a separator 152 is made up of the two conductors 171, the magnets 172, the spring 178, the plate 177, and the frame of the machine. Every time said circuit is completed in the manner designated an electric pulsation is sent through the magnets 172. Each of said pulsations depresses the armature 179 on the magnet-arm 180 against the tension of the spring 181 and operates the escapement 118, thereby allowing the counting-escapement rack 122 and the slide tangent-bar 117 to move downward one tooth at a time under the influence of the spring 139, which extends between the upper end of said bar and of the bearing 127. The vertical rack 122 is located in the rear of the bar 117, to which it is rigidly fastened. The arm 180 is pivoted to the extension from the frame A that supports the magnet 172, and the escapement 118 is suitably pivoted to said arm.

The mechanism and its operation just described has fully revealed the interrelation of the two vertical slide-bars 117 and 119, with the means whereby the former is displaced one step to represent each space which the line requires and the latter an amount equal to the full shortage of the line, less the temporary separators between the words. The remaining details of the computing devices will now be described, and a description of the mechanism and operation will be supplemented by an explanation of the underlying principles upon which they act.

The main computing element is comprised in the bar 111, which is inclined with reference to the number of intervals in the line to indicate the number of spaces needed in the type-line being measured. This bar is a straight edge attached near its left end by the pivotal support or pivot 110 to the frame A. The center of the support 110 in this construction indicates the required type-line length. The upward and downward inclines of the bar 111, taken on either side of its pivotal center, are used for measuring the amount of difference existing between the unjustified type-line and the length required by the width of the column or page for which said line is being justified, the relation of its position to the line-gage designating the amount of shortage (or excess) and the degree of its incline denoting the number of spaces required.

The amount of taper or incline in the computing-bar 111 is changed to suit the number of spaces required, so that the same indexes which designate the sizes of spaces required are employed to designate the full amount of deficiency whatever may be the number of parts into which this deficiency must be divided. That portion of the bar 111 extending left of its pivot 110 constitutes an opposite gage to that employed to measure deficiencies and is employed for determining the amount of reduction which a line, with its separators, may need in case its length is slightly in excess of the measurement required. The pivot 110 projects frontwardly and rotates in the frame A, the bar 111 being rigidly secured to said pivot. The right-hand end of the bar 111 is engaged by the box 114, connected to the slide-bar 117 by the pivot 115. The path of the vertical travel of the bar 117 is on a tangent to the arc described by the radial bar 111 and fixes the tangent at whatever point the intersection between said bars may occur, said slide-bar determining at its successive positions the amount of inclination in said radial bar necessary to gage the line deficiences which require different numbers of spaces. The bar 117 slides in the bearings 125 and 127, rigidly fastened to the middle bracket of the frame A, being in reality integral with the bearings 124 and 126, respectively. The various positions of said slide-bar are determined by the teeth of the escapement-rack 122, and when located it is positively held in position by means of the horizontal locking-bar 269, which slides in suitable boxes in the frame A, and has its projecting point 272 in engaging relation with the teeth on the locking-rack 108 on said bar 117, said teeth corresponding with the teeth of the rack 122. The bar 269 is thrown out of engagement by the projection 273 near its left end, which is in engaging relation with the gage-block 132. The bar 269 is brought into engagement with one of said locking-teeth by the locking-spring 271, fastened to the frame A and extending over the bar-shoulder 274. The bar 117 is tensioned downward by means of the coiled spring 139 and returned to its starting-point after the measuring operation has taken place by means of the surface cam 746 on the line-shaft 700 through the arm 748 and its extension 749, said extension having the projection or roller 747 in contact with said cam, while the upper end of said arm bears beneath the roller 116 of said bar. The roller 116 has its bearings in an arm extending to the right from the bar 117, to which said arm is securely attached, for a distance sufficient to bring said roller over the arm 748. The arm 748 and extension 749 are pivoted at 751 to said middle bracket. The amount of inclination given to said computing-bar by each of the teeth on the racks 122 and 108, or the pitch of said teeth, is directly governed by the sizes of the preconstructed spaces or combination of spaces called "space values" with which the machine is provided, as further explained.

The bar 119, which, through the plate 119$^b$, the rod 119$^a$, and gage 120, virtually rests upon the type-line to determine its length, is provided, as stated, with the gage-projecting blade 112 for designating the direction of a line or series of lines with reference to the bar 111, which indicates the amount of spacing needed. The blade 112 extends to the left beyond the composing-bar pivot 110, parallel with the computing-bar 111 when the latter is located at its starting-point, is preferably at right angles with the bar 119, and determines the path of the gage-block 132 and its contact-block 136, said gage-block being made to slide on said blade. The contact-block 136 is pivotally attached to the upper right-hand corner of the gage-block 132 and bears on the under edge of the bar 111. The gage-block 132, having a movement in radial relation to the bar 111—that is, a movement along a radius from the pivot 110 or along lines parallel with said radius—represents or designates the length of the type-line to be justified and is movable to the right and left along the blade 112 to represent or designate said type-line length at all points along said bar. In its adjustment said blade is located a sufficient distance below the pivot 110, so that when the type-line is full the contact-point (represented by the block 136) at whatever place it may be along said blade will be in the plane of the center of said pivot and tight against the lower edge of said computing-bar. The gage 120 being substantially integral with the blade 112 and resting upon the type-line, will locate the position of the gage-contact block 136 a distance below the center of the pivot 110 equal to the line-shortage measured with its separators. The gage-block 132 is provided with a horizontal slideway for it to slide over the blade 112 and with a pivotal screw, by means of which it is engaged by the long arm of the bifurcated locating-arm 250 through the connecting-rod 251. The locating-arm 250 is provided with the roller 257 in operative engagement with the cam 750 on the line-shaft 701, by means of which the block 136 is thrust within the angle made by the bar 111 and the blade 112. The coiled spring 254 has its left end fastened to the frame A and its right end to the extension 255 of the arm 250, which is loose on the stud 252, projecting forward from said frame. It will now be seen that the arm 250 is constantly tensioned to the right, and when released from the influence of the cam 750 the resiliency of the spring 254 causing said arm to move the gage-block 132 sensitively in that direction toward the intersection of the bar 111 with the blade 112 until the contact-block 136 is intercepted against the engaging edge of said bar, thereby determining what size of space would accurately justify the line if the machine was able to provide any required size. The cam-operating arm 259 and the setting-arm 228 have a common sleeve loosely mounted on the stud 252, and the adjusting-arm 258 is loosely mounted on said sleeve between the two first-mentioned arms. The arm 259 has the roller 260 in engaging relation with the cam 752 on the line-shaft 701, and the arm 258 is provided with the roller 253, located in the path of the cam 753, also on said shaft. The arms 259 and 228 are constantly tensioned to the right by the spring 229, extending between the latter arm and the frame. The arm 258 is provided with the projection 430 about midway between its upper end and the stud 252, and it is further provided at its upper end with the vertical projection 415 of the adjusting-pawl 414, pivoted thereto. The pawl 414 is in the path of the gage projection 262 and has the leftward-extending point 413 adapted to engage the teeth 416 on the index-bar 404. The coiled spring 261, which is about double the strength of the locating-spring 254, has its right end fastened to the arm 258 and its left end to the projection 263, extending from the frame A, thereby giving said arm a constant tendency to swing to the left. At the proper time the projection 262 on the block 132 and the pawl 414 on the arm 258 come into contact with each other, said arm being drawn to the left by the stronger spring 261. The contact of the pawl 414 with the block projection 262 tilts the point 413 upward into engagement with the teeth 416 for the purpose hereinafter set forth. The bar-teeth 416 indicate the sizes of spaces with which the machine is provided. The pawl 414 drops below the index-teeth 416 by gravity, being raised to an engaging position therewith by the projection 262, as just pointed out.

The adjusting-arm 258 is indirectly connected to the space-selecting devices by means of the projection 430, through the collar 433, which is operatively connected thereto, as will appear later, and other parts yet to be described, said collar being loose around the quotient-shaft 421, suitably journaled to the frame A. The projection 430 is pivotally connected to the collar 433. The collar 433 has the bifurcated ear 428 extending upward on each side of the fixed guide-rod 423, whereby a longitudinal movement of said collar on the shaft 421 alone is permitted.

Having described the mechanism by means of which the required amount of spacing is determined and communicated to the space-dislodging mechanism, I will now describe the principle underlying the method whereby said required amount of spacing is determined upon.

Geometrically speaking, the longitudinal motion of the bar 117 is proportional to the tangents of the angle described by the left or bottom straight edge of the bar 111 and a line passing through the center of the pivot 110 and parallel with the bar 112—that is, the value of the angle in this construction is designated by the computing edge. This angle the bar 111 forms with relation to its normal position or when it is perpendicular to the direction of motion of the bar 117; the measure of the tangents being on lines parallel with the motion of said bar 117 and passing through the center of the contact-point 136 when said point is located along said bar 112 at the various positions determined by the index-teeth 416 on the bar 404. The positions of the bar 111 are fixed by the counting-teeth 122 and held by the locking-teeth 108 when engaged by the point 272 of the bar 269, said teeth being equal distances apart to represent equal distances between a series of consecutive triangles which have their apices on the common point at 110 and their bases upon the same straight line. The teeth are employed to locate a known proportional difference between a known and an unknown quantity. One of these sets of tangents referred to—that is, the one the measure of which corresponds to a known quantity or the distance between the teeth 122, which bear a proportional relation to the thickness of the space values employed, said space values being measured by said tangents within the last-mentioned angle and parallel with the bar 117 and at the various positions of said point 136 when located by said teeth 416—is increased, according to the number of space values wanted by the action of the magnet 271. It then remains to determine which of the proportionals corresponding to the index-teeth 416 is equal in length to the line shortage, and this is accomplished by causing the gage-point 136, that, as already stated, represents the exact length of the line, to move rightward until it comes in contact with the bar 111, and the index representing the space value which was passed will indicate the location of the tangent, the length of which corresponds to the full dimension of a pile composed of the required sizes and numbers of space values. The teeth 418 of the space-plunger rack 419 bear a proportional relation to the index-teeth 416, and the amount of their distances apart is fixed by the position of the collar 433, which is connected to the arm 258 by the projection 430, the distance apart of said teeth 418 corresponding exactly with the distance apart of the space-channels 123. The rack 419 is provided with the above-mentioned teeth 418 on the top and the difference-teeth 318 on the bottom. Said rack is rigidly attached to the sleeve 420, extending to the left therefrom, and the left-hand end of the space-value-locating rod 417 is secured to the upwardly-projecting lug 424 at the right-hand end of said sleeve. The sleeve 420 reciprocates on the guide-rod 425, mounted in the front of the frame A. The position of the locating-arm 258 as its pawl 414 is engaged with any one of the index-teeth 416 causes the location of the rod 417 to be fixed, so as to bring the actual space-selecting members into relation with that particular size of space which corresponds to the tangent representing the line shortage divided by the number of spaces required in the manner presently to be described. It will then follow that if the required number of this size of space is inserted in the line the line will be properly justified.

I will now describe what I term the "difference device" or "remainder-gage"—that is, the mechanism by means of which the inaccuracies of the first measurement are corrected.

In the first process of measuring the type-line the position of the blade 112, as it practically rests upon the end of the type-line, and the angle of inclination of the computing-bar 111, as it is inclined according to the number of spaces required, will in all probability locate the contact-block 136 in such position that the indirect interlocking of the arms 250 and 258 cause the pawl-point 413 to rise between two of the space-index teeth 416.

The index-teeth 416 simply designate the locations, or rather the sizes, of the preconstructed space values with which the machine is provided, while the location of the contact-block 136, and the consequent position at which the end 415 of the pawl 414 first meets the projection 262 of the block 132 and the resulting elevation of the pawl-point 413, indicate the exact space value which is ascertained in a given type-line by the division of the line shortage by the number of spaces needed and also the size of spaces which, if available, would accurately justify the line. Since the machine is not supplied with an infinite number of space values, but only the different sizes represented by the teeth 416, it becomes necessary to provide mechanical means for utilizing two neighboring sizes for the purpose of justification when the pawl-point 413 rises between two of said teeth, such as are described below.

The lower wedge-block 312 is tight on the rod 119$^a$, and the arm 731 engages said rod at this point. The upper wedge-block 310 is secured to the front of the connecting-block 119$^b$, loosely sleeved on the rod 119$^a$. The right-hand smaller terminal of the difference-wedge 311 enters between the blocks 310 and 312 and is adapted to be driven between the same for the purpose of separating them. The rock-shaft 295 is mounted on the inside of the left-hand bracket of the frame A and has the cam-operating arm 392, the wedge-actuating arm 302, and the lifting-finger 394 fast thereon. The connecting-bar 301 extends between the upper end of the arm 302 and the left-hand end of the wedge 311. The roller 395 on the upper end of the arm 392 is tensioned against or toward the periphery of the difference-cam 759, fast on the transverse line-shaft 701, suitably journaled within the frame A by means of the spring 303. The right end of the spring 303 is attached to the extension 304, depending from and rigidly attached to the rock-shaft 295, and the left end of said spring is fastened to the frame projection 263.

The difference-trip 335 extends beneath the difference-teeth 318 and is loose on the front end of the vibrating lifting-bar 356. The rear end of the bar 356 is pivoted at 357 to the rule-stud 739 and said bar passes over the lifting-finger 394. The link 358 is pivoted at 359 to the middle bracket of the frame A and guides the bar 356, the left end of said link loosely encircling the front terminal of said bar. The spring 360 encircles the bar 356 and bears on the right extension of the trip 355 to yieldingly hold the latter in an elevated position against the teeth 318 and allow sufficient play for it to perform its work. The support 361 extends to the left from the middle frame-bracket to limit the downward movement of the bar 356. The wedge 311 is drawn to the left-hand end of its stroke by the action of the cam 759 and the trip 355 is elevated against the teeth 318 through the medium of the intervening parts; but when the roller 395 enters the depression in said cam said trip is lowered away from said teeth as said wedge is driven between the blocks 310 and 312. The springs 303 causes the wedge 311 to be tightly driven between the wedge-blocks 310 and 312 for a distance corresponding to the difference hereinbefore referred to, and the cam 759 now remains stationary by reason of the stopping of the line mechanism. The trip 355 is elevated, so as to actuate the rack 419 the distance from one of the teeth 318 to the next at the proper time and in the manner hereinafter set forth. The spring 360 allows the teeth 318 to click over the end of the trip 355 when the latter is in engagement therewith, and the rack 419 is actuated to the left. The right-hand end of the lifting-finger 394 bears on the top of the lug 377, extending from the rear of the difference-controller rod 378 near its lower terminal.

The device herein described for the purpose is employed to determine the proportional difference between the position along the bar 404 at which the pawl-point 413 was first elevated into engagement with the teeth 416 and the amount of distance it is located from the neighboring tooth on said bar to the left of the one last passed by said point. In the event of the pawl-point 413 striking between two of the teeth 416 the superior force of the spring 261 causes the gage-block 132 to return to the left against the resiliency of the spring 254 until said point encounters the next tooth in that direction, when the several coacting parts that have been engaged in this performance remain stationary until the difference thus ascertained can be utilized. It will be remembered that the bar 111 is securely locked into position, while the position of the bar 112 is fixed by the length of the type-line in the measuring-channel 182. Consequently the return of the gage-block 132 with its contact-block 136 from a position tight within the angle formed by said bars must create a looseness in the machine. This looseness is measured by the wedge 311, which is driven between the wedge-blocks 110 and 112 at this time, elevating the upper block 110 and carrying with it the connecting-block 119$^b$, the bar 119, and the blade 112 until the contact-block 136 is once more tight against the lower edge of the bar 111. The looseness previously alluded to being gaged by the wedge 311, determines the number of units required. A unit in this case is equivalent to the difference between two neighboring sizes of space values with which the machine is equipped. Upon determining the amount of this proportion or the number of units, which in this case corresponds to the remainder in simple division, suitable mechanism is employed to rejustify, as it were, this difference. The operation brought about by the resultant of this second computation in this particular construction causes the space-selecting device to shift position, and the justification of the line is accomplished by the employment of as many space values of a larger size as there are units in the remainder, together with the balance of a smaller size, thereby utilizing two neighboring sizes of space values, those of the larger size being first introduced into said line, however.

I will now describe the two controlling devices, which are substantially identical in construction and operation. These predetermine the time of future required motions by means of certain qualities existing in the line to be justified. In this particular application these two controllers are employed to determine at what time the action of the machine shall change upon its operation from one line to the next and upon one size of space values to another size.

The three arms 297, 292, and 294 are preferably integral with a sleeve loosely mounted on the rock-shaft 295. The clutch-controller 297 extends to the left from the shaft 295 and has the pin 298 projecting forward into the slot 224 in the lower terminal of the depending tripping-link 223. The setting-arm 292 is provided at its upper end with the roller 299, tensioned against or toward the periphery of the clutch-controller cam 758 on the shaft 701 by the spring 290, extending upward from the arm 297 to the left-hand frame-bracket, and the arm 294 extends to the right over the horizontal part of the angular clutch-controller trip 296. The trip 296 is pivotally attached to the fixed sleeve 289 on the clutch-controller rod 278, and is normally retained with its two arms in a horizontal and vertical position, respectively, by the spring 288, fastened to the front of said sleeve and extending upward to bear on the under edge of the horizontal part of said trip.

The clutch-controller rod 278 and the difference-controller rod 378 are mounted side by side in the frame-brackets 104 and 105, in which they reciprocate vertically, and are provided with the notches or teeth 287 and 387, respectively, on the right side thereof. The controller-rods 278 and 378 also pass through bearings on the frame-brackets 103, and the detents 279 and 379, which are pivoted at 286 to said bracket, are adapted to engage the teeth 287 and 387, respectively, being actuated toward them by the spring 285. The flat friction-springs 305 are fastened to the left-hand edge of the upper bracket 104 and extend downward to bear on the rods 278 and 378 for the purpose of retaining them against gravity at whatever position they may be left in by their operating members. The rods 278 and 378 are also respectively provided with the dogs 284 and 384, fast thereon, each of said dogs engaging the neighboring rod to prevent the one to which it is attached from turning. The vertical lifting-bar 605 has its slide-bearings in the brackets 104 and 103 and is tensioned downward by the spring 604, extending upward from said bracket 104 to the top of said bar. On the right side of the bar 605 is secured the downwardly-extending cam-finger 606, bearing on the word-shaft 600 and in the cam-groove 603 in said shaft. The controller-pawl 280 is pivoted at 283 to the lower terminal of the bar 605 and is arranged to engage the teeth 287 and 387, being tensioned toward said teeth by the spring 282. Since the rotary motion of the word-shaft 600 is constant, the cam-groove 603 causes the finger 606 and the bar 605, with the pawl 280, to rise and fall with every revolution of said shaft, and when the rods 278 and 378 are depressed with said pawl and the detents 279 and 379 in engagement with the teeth 287 and 387 said rods are simultaneously elevated one tooth at a time for every such revolution, said detents holding said rods while said pawl descends for a fresh engagement. The detents 279 and 379 and the pawl 280 are thrown out of engagement with the teeth 287 and 387 by the trip 397, pivoted at 398 to the bracket 103. The trip 397 extends from between the rods 278 and 378 to the tripping-cam 760 on the shaft 701, against the periphery of which the left end of said trip bears. When the high part of the cam 760 turns beneath the trip 397, the latter is forced upward and to the right, encountering the detents 279 and 379 and the pawl 380 and disengaging them from the teeth 287 and 387, thereby leaving the rods 287 and 387 free to be depressed. The counting-bar 117 is provided at its base with the hook or stop 276, which extends to the left into the path of the trip 296 when the vertical part of the latter is tilted to the right. This stop registers by its position the counting of the spaces for the subsequent action of the clutch-controller.

After the bar 117 has dropped the required number of notches as determined and permitted by the counting mechanism and the computing devices have acted to the extent of returning the gage-block 132 to a position fixed by the contact of the pawl-point 413 with the index-tooth 416, adjoining the position first occupied by said point, the cams 758 and 759 allow the arms 292 and 392 to move to the right under the influence of the springs 290 and 303 for the purpose of depressing the controller-rods 278 and 378. The arm 294 in its downward movement bears on the horizontal part of the trip 296, tilting it down onto the stop-pin 291, which projects from the sleeve 289, and drawing the clutch-controller rod 278 downward until said trip encounters the stop 276 at the base of the bar 117. Since the bar 117 is locked into position by the bar 269, the downward movement of the rod 278 is checked by the contact of the trip 296 with the stop 276. When the arm 294 is again elevated by the motion of the cam 758 and the rod 278 raised, the spring 288 rocks the trip 296 clear of the stop 276, and the bar 117 is free to be elevated to its starting-point by the cam-actuated arm 748 as soon as the return of the block 132 to its initial position has released said bar from the bar 269 through contact with the projection 273 on said last-mentioned bar. The rod 278 has now been moved downward the same distance as that traveled by the bar 117. At the same time the rod 278 is depressed the difference-rod 378 is lowered by the finger 394, which bears on the lug 377 at the back of said rod, and the wedge 311 is driven between the blocks 310 and 312, the downward travel of said difference-rod being governed by and corresponding to the depth that said wedge enters between said blocks.

Before the actions just described take place the trip 397 is tilted upward and to the right by the cam 760 and throws the spring-actuated pawl 280 and the detents 279 and 379 out of engagement with the teeth 287 and 387 on the controller-rods 278 and 378, thus leaving said rods suspended under the merely normal pressure of the springs 305. Simultaneously with the insertion of the first space into the type-line the high part of the cam 760 turns from beneath the trip 397, and the pawl 280 and detents 279 and 379 are thereby permitted to reëngage the teeth 287 and 387. The cam-finger 606, operating through the cam-groove 603 in the constantly-revolving word-shaft 600, intermittently elevates the lifting-bar 605, and with it the pawl 280. Consequently the rods 278 and 378 must be actuated upward by said pawl when in engagement with the teeth 287 and 387 one step at a time for every revolution of said shaft, the reciprocating travel of said bar being of the right distance for that purpose. If five spaces, for instance, are required in a line of type undergoing justification, the bar 117 will have dropped for a distance represented by five of the teeth on the rack 122 and the rod 278 will have dropped for a distance represented by five of the teeth 287. Hence said rod must be raised that distance to its initial position. When the last step of the rod 278 is taken, the trip 296 encounters the arm 294 and depresses the arm 297, which draws down the link 223 and throws the projection 226 into the path of the clutch-cam 611 for the purpose of setting the line-shaft 700 with its dependent mechanism in motion. It follows from the foregoing description that if the rod 278 is elevated one tooth each time a space is inserted in the type-line the instant the last space is inserted in said line the line mechanism is started, because said rod has then reached its highest point. The rod 378 is synchronously elevated with the rod 278, and when the former arrives at its highest position the lifting-bar 356 is raised by the lug 377 and the finger 394 sufficiently to actuate the rack 419 the distance represented by one of the teeth 318 through the medium of the trip 355. This last movement takes place before the clutch mechanism is actuated and draws the space-selecting members to the left, causing them to act upon a new combination of spaces, or the smaller of the two sizes employed. The arrangement of the parts which elevate the controller-rods is such that one may reach its initial position before the other and there remain until the second arrives at a corresponding position, the difference-controller rod 378 being the one to arrive first, since it drops only as many teeth as there are space units in the remainder, or space values of larger dimensions than those first selected, while the clutch-controller rod 278 drops as many teeth as there are space values in the whole line. Should there be no difference in the measurement, the difference controller rod is not disturbed, the wedge-blocks 310 and 312 preventing any movement of the wedge 311 and connecting members.

I will now describe the clutch mechanism and other connections for imparting motion to the three principal driving-shafts. The driving-pulley 601 is fast on the end of the short word-shaft 640, extending to the left from the left-hand bracket of the frame A, and the gear 641 is also rigid on said shaft adjacent to said bracket. The gear 641 meshes with the gear 613, tight on the end of the main word-shaft 600, that extends beyond the said left-hand frame-bracket, and with the idler drive-gear 775 loose on the main line-shaft 700. The gear 641 is about one and one-half times the size of the gear 613 and the gear 775 about one and one-third times the size of said gear 641. It is desirable to drive the line mechanism at a slower speed than the word mechanism, for the reason that better results are obtained by running the former at a moderate rate of speed and in order to give the latter time for the performance of its numerous motions, as compared with said line mechanism. Hence the above difference in gearing is provided. The clutch-cam 611, tight on the left extremity of the shaft 600, is provided with the left-hand groove 612 and the right-hand groove 642, with the trip-engaging cam 643 on the right periphery of said clutch-cam adjacent to the V-shaped projection 644, that lies across said left-hand groove and to the path leading from said right-hand groove to the left. The clutch-operating arm 763 is centrally pivoted at 764 to the frame-bracket 113 and has the roller 783 on its front end extending upward to be engaged by one or the other of the cam-grooves 612 and 642. The clutch-engaging finger 231 is pivoted at 230 to the right side of the arm 763 and extends forward beneath the right periphery of the cam 611. The upper end of the link 223 is pivotally attached to the rear end of the finger 231, and the tripping projection 226 extends upward from the front end of said finger. The left face of the hub of the gear 775 is provided with the four teeth 771. The clutch-cam 782 is keyed or otherwise attached to the left end of the shaft 700 in such a manner that it can slide longitudinally thereon, but when rotated must carry said shaft with it. A single tooth is provided on the right face of the cam 782, adapted to be engaged with and disengaged from the teeth 771 at any fourth part of a revolution of the gear 775. The fixed post 787 extends upward from the frame A, and its upper extremity enters the groove 777 in the cam 782. The stiff spring 781 is secured to the left of the periphery of the cam 782, and its free terminal extends over the groove 777. The rear end of the arm 763 is forked to fit over the end of the shaft 700 and bear against the left face of the cam 782 at the proper time. The transverse line-shaft 701 is driven from the main line-shaft 700 by the intermeshing beveled gears 703 and 702, the former on the rear end of said shaft 701 and the latter on said shaft 700.

When the link 223 is drawn down by the arm 297 under the influence of the clutch-controller rod 278, the finger 231 elevates the projection 226 into the path of the cam 643 on the periphery of the constantly-revolving cam 611, and said projection is thereby actuated to the left, carrying with it the front end of the arm 763. This movement of the arm 763 throws the roller 783 from the groove 642 against the projection 644 and into the groove 612, and at the same time the rear end of said arm crowds the cam 782 to the right, overcoming the force exerted by the stiff spring 781 on the post 787 until the tooth on said cam engages the teeth 771 on the idler-gear 775, when the two line-shafts 700 and 701 and their attached members are set in motion. When the depressions in the cam 758 and 759 arrive at a position to receive the rollers 299 and 395 and the elevated part of the cam 760 is beneath the trip 397, the rods 278 and 378 are depressed in the manner before explained, and said first-mentioned rod no longer has any influence over the clutch mechanism. After the clutch-controller rod is depressed the V-shaped projection 644 comes around and switches the roller 783 back into the groove 642, thus swinging the rear end of the arm 763 to the left away from the cam 782. The end of the post 787 in the groove 777 now retains the cam 782 in engagement with the idler-gear 775 until the end of the revolution of the line-shaft 700, when the spring 781 rides onto said post and forces said cam to the left out of engagement with said gear.

Prior to the completion of the line-shaft revolution the cams 758 and 759 return the arms 292 and 392, with their integral or attached members, to their normal positions; but this action does not depress the arm 297 sufficiently to affect the link 223, enough play for the pin 298 being provided for the purpose by the slot 224. At the completion of the line revolution the high part of the cam 760 has passed from beneath the trip 397, which leaves the intermittent actuating mechanism for the rods 278 and 378 in proper condition to commence operation on the same. The front end of the finger 231, with the projection 226, drops by gravity from the path of the cam 643 when the downward pressure on the link 223 ceases to be exerted.

The complete operation of the computing devices, including the operative setting of the actuating mechanism for justifying, takes place while the machine is simultaneously manipulating two distinct lines of type, and in the present construction for mechanical reasons the machine is so timed that while the line is within the measuring-clamps as many of the motions are allowed to take place as can conveniently operate without interference with those connected with the line into which the spaces are being inserted. During this time the line-shaft is disengaged from the driving mechanism and allowed to remain in a position of rest to compensate for the different numbers of words which occur in different lines, being in operation during the handling of the first and last end of the line for the proper commencement on the first space and the displacement of the space-actuating mechanism after the insertion of the last one.

By means of the line-shaft clutch and coacting parts hereinbefore described I am able to transmit an intermittent rotary motion to the line-shaft 700 from the constant rotary motion of the word-shaft 600, depending upon and varying in length of time with the number of spaces in each line, this result being obtained by introducing an engaging projection at the proper time within the line of transmission of power.

I will now describe the space-selecting device and other parts intimately associated therewith and with the measuring and locating devices. The space-selecting forms 400 are mounted on the right-hand terminal of the shaft 421 beneath and in the rear of the space-channels 123 and constitute collectively the most essential element in the actual work of appropriating the spaces needed by the various lines. These forms are grouped together in a series, or they may be said to form a package, and their peripheries are indented and depressed, each different from the other, to correspond to different sizes and numbers of spaces, the combinations of which are herein termed "space values." The space-channels 123, fixed to the upper part of the machine at the right, are designed to contain different sizes of individual spaces, a collection or combination of which, as selected by the forms 400, makes a space value for insertion between two words. It is obvious that some lines may be justified with individual spaces—as, for instance, when the line requires spaces the same size as the temporary separators 152—and for this reason, as well as for the sake of brevity, the terms "space" and "space value" are used generally in this specification as equivalents, meaning either an individual space or a combination of such.

It will be pertinent to state here that the particular tooth 416 which locates the center of the contact-block 136 directly below the center of the pivot 110 corresponds with the particular channel 123 containing the separator size of spaces, while the teeth to the right of said tooth correspond to spaces or space values of larger sizes than said separators, and those to the left correspond to smaller sizes. The forms 400 are rigidly secured to the hub 407, which is attached to the shaft 421 by means of a spline or in any other suitable manner, so as to provide for a longitudinal movement of said forms on said shaft while rotatably connected therewith. At the left end of the hub 407 is the collar 408, loosely mounted thereon and attached at its lower end to the space-value-locating rod 417. Rigidly mounted on the right end of the shaft 421, between its right-hand bearing and the forms 400, is the adjusting-cam 402. The quotient-shaft 421 is driven by the small gear 645, meshing with the word-gear 641, the latter being one and one-half times larger than said gear 645. The collar 433 has the depending dog 429 at the left-hand end, provided with left and right inclined surfaces. The trip 422 is pivoted at 447 to the upwardly-projecting ear 426 at the left-hand end of the locating-sleeve 420 and has right and left inclined surfaces capable of engaging the similar surfaces on the dog 429. Integral with the trip 422 and extending below the left, engaging end of the same, is the hook 446. The left engaging terminal of the trip 422 with the hook 446 are tensioned upward by the flat spring 427, extending beneath said hook. The block 448 is reciprocally mounted on the guide-rod 425 and is reciprocated by means of the setting-arm 228, the head of which is operatively attached to said block. The hook 431 projects to the right from its rigid connection with the block 448 and is adapted to engage the hook 446. The detent 438 is pivoted at 439 to a portion of the frame A and normally engages the teeth 418 on the rack 419 under the influence of the gravity-trip 440 and the spring 441, which connects the left end of said detent with said trip. The trip 440 is pivoted at 442 to the frame and has the arm 744, which lies in the path of the cam 745, so arranged as to actuate the detent 438 out of engagement with the teeth 418 at the proper time. The cams 745 and 753 consist of plates fastened to the front face of the cam 750, and the cam 752 is a plate secured to the rear face of said cam 750. The cam 402 is always beneath the false-bottom lifting-roller 403 of the collecting device, and when the forms 400 are inactive so far as performing any work is concerned at the extreme right end of their longitudinal movement the left-hand blank cam or form 406 is beneath the false-bottom roller 401; but said forms may be adjusted so as to bring any one of them beneath said last-mentioned roller.

After the gage 120 has been actuated against the end of the line for the purpose of taking the measurement thereof and the temporary spaces or separators 152 have been duly counted the measuring instrument is set according to these two requirements and the automatic mechanism locates the collar 433 by means of the arm 258 in accordance with the result obtained from the measurement. The machine then proceeds to unclamp the line by elevating the gage 120. Said line is next raised by the line-lifting plate 202 onto the lifting-blade 200 beneath the feed-channel 183, said plate now occupying its uppermost or foremost position in alinement with the bottom of said channel. The blade 200 is transferred with its type-line by means of the cam 784 from its position in front of said lifting-plate to a position above and beyond it, leaving said plate free to return for the next succeeding line. The first part of these motions occurs while the blank form 406 is under the roller 401. During the time that the roller 403 is elevated by the cam 402 the roller 401 is raised clear of all of the forms 400 and the rod 417 is carried to the left by the setting-arm 228 through the medium of the now engaging hooks 446 and 431 and intervening members. When the left inclined surface of the trip 422 encounters the right inclined surface of the dog 429, the hook 446 is actuated downward against the force of the spring 427 and releases the hook 431, thereby leaving the sleeve 420 stationary on the guide-rod 425 with the forms 400 located with reference to the space-collecting device in exact accordance with the position of the measuring instrument. The cam 753 continues to rock the arm 259 until the block 448 has reached the extreme left end of its travel along the rod 425, when the spring 229 causes the arm 228 to return said block into contact with the sleeve 420. The detent 438 by its engagement with one of the teeth 418 prevents the sleeve 420 from being disturbed by the movement of the block 448 to the right, provided such engagement takes place at the time said sleeve is located, as will be the case when there is no difference. Otherwise the impact between said block and sleeve under the force of the spring 229 returns the rack 419 to the right until the first tooth at the left of the detent-point encounters said point. The position now occupied by the space-selecting device is the one necessary for utilizing the smaller of the two sizes of space values with which the line is to be justified or the space value required for use throughout when no difference exists. After the selected form 400 has performed its work the series is returned to its starting position at the right through the medium of the spring 229 and intermediate parts, the detent 438 being actuated out of engagement with the rack 419 by means of the cam 745 and the trip 440. The arm 258 is rocked to its initial position by the cam 753 just prior to the return of the sleeve 420, the position of the latter not being affected by the location or movement of the collar 433 at this time, because the trip 422 readily yields to the dog 429 and the constant engagement of the hooks 446 and 431 is not essential until later, as fully explained.

After the rule has been removed from the type-line being acted upon and said line is thrust forward by the lifting-plate 202 the next step is to elevate said line at intervals corresponding to the number of words contained therein. This operation is performed by a lifting-blade manipulated through the medium of cam-actuated members constructed and arranged in such a manner as to impart a positive upward movement to said blade at the beginning of its travel, with a word-intermittent motion therefor during the remainder of the ascent. Said intermittent motion depends upon a compensating device which causes the blade to mount in its channel while unopposed, but permitting the ascending blade to be stopped by an obstruction and held stationary. The obstruction referred to in the previous sentence consists of wards so arranged as to limit the upward movement of each word next below the leading word by stopping the separator 152, which has no nicks 150 and 151, like the type, to register with said wards.

The mechanism of the line-lifting device will now be described. The line-lifting cam 784 is rigid with the line-shaft 700 and is provided on its right surface with the groove 785, in which the roller 786 on the arm 789 operates. Said cam-groove is approximately the width of the diameter of said roller for a short distance only, the other portion being wide enough to give the latter a certain amount of freedom. That part of the cam-groove 785 which is farthest away from the shaft 700 is adapted to bring the line-lifting blade 200 into position in front of the plate 202 by a positive action with its top flush with the bottom of said plate, while that part of said groove which passes nearest said shaft is adapted to hold said blade beyond or above said lifting-plate, at the same time giving the arm 789 a certain amount of freedom or play, owing to the increased width of said groove. The operating-arm 789 is rigidly fastened to the ratchet-sector 791 and the lifting-arm 792. The arm 792 through the connecting-rod 793 operates the lifting-blade 200, which is fast to the sliding blade-mounting block 237, tight on the guide-rod 277, operating through suitable bearings on the front of the frame A. The collar 281, fast on the rod 793, is pivotally attached to the rod 277. The arm 614 is loosely pivoted around the rock-shaft 790, to which the arms 789 and 792 and the sector 791 are rigidly connected and has its roller 615 continually tensioned toward the shaft 600 by means of the spring 616, which has one end attached to the rearward extension 617 of said arm 614 and the other end to the frame A. The arm 614 is further provided with the pawl 618, pivoted at 621 to the downwardly-extending finger 633 of said arm, with its point 619 adapted to engage one of the teeth of the sector 791. The pawl 618 has the projection 620, which lies in the path of the cam 795. The pawl 618 is normally pressed upward into engagement with the sector 791 by the spring 622, which is secured to the back of the finger 633 and bears on the pawl projection 620, and said pawl is positively disengaged from said sector by means of the cam 795 on the shaft 700. The surface-cam 623 is fastened to the word-shaft 600 and is provided with the inclined depression 624.

Since the arm 792 is long and rather heavy, it may have the prolongation 788 behind the rock-shaft 790 and be provided with the counterweight 794 on said prolongation, as shown in Fig. 2, for the purpose of balancing said arm and assisting in the delicate operation of the machine during the performance of the work required of said arm and attached members. The hooked arm or clamp 203 is pivoted at 216 to the frame A and extends forward to engage the guide-rod 277 with its hooked front end. The clamp 203 is normally tensioned into engagement with the rod 277 by means of the spring 204, which extends between said clamp and a pin driven into the frame above the galley $b$. The rear prolongation of the clamp 203 lies in the path of the extension 555 of the arm 546 when the latter is actuated to the extreme left end of its travel, which occurs only at the completion of a line. During the intermittent upward movement of the rod 277 said rod is firmly grasped by the clamp 203 under the influence of the spring 204 not tight enough to prevent such movement, but with sufficient energy to hold said rod with the blade 200 at whatever position they may be left in by the action of the lifting mechanism described above. When the line is complete and ready to be transferred onto the galley $b$, the increased movement of the arm 546 at this time rocks the clamp 203 against the resiliency of the spring 204 and away from the rod 277, leaving the latter free to be depressed by the arm 792 and its operating members.

The operation of the line-lifting mechanism is as follows: The cam 784 by means of the groove 785 brings the line-lifting blade 200 into its lowest engaging position for the new type-line through the medium of the arms 789 and 792 and the rod 793 and as soon as said line is lifted out of the channel 182 by the lifting-plate 202 transfers it beyond the opening through which it came, leaving said lifting-plate free to return. This action takes place while the cam 795 has caused the point 619 of the pawl 618 to swing out of engagement with the teeth on the sector 791. Said cam continues to rotate, and its projection passes away from the pawl projection 620, allowing the point 619 to become reëngaged with the sector 791, the spring 622 performing this office. Upon the next revolution of the cam 623 the roller 615 falls into the depression 624, thereby retating the sector 791 through the medium of the pawl 618 and the arm 614, and consequently swinging the arm 792 upward as far as the line is free to move without any obstruction, the roller 786 playing freely in the wide part of the cam-groove 785; but upon being opposed by the contact of a separator 152 with the wards 522 and 523 said cam 623 rotates away from its roller, leaving the latter separated from the depressed surface 624 on account of said obstruction, which prevents said arm 792 from continuing its upward motion, said obstruction temporarily meeting the resistance of said spring 616. The cam 623 and the arm 614, with the parts operating therewith, may be termed a "compensating" device. The opposite or projecting side of the cam 623 coming into engagement with the roller 615 presses it downward and releases the tension on the arm 792, allowing the latter to remain in its last-placed position by means of the friction between the coacting parts, especially between the rod 277 and the clamp 203. The depression of the arm 614 causes the pawl 618 to click on said sector and engage one or more teeth lower down, thereby causing the arm 614 to take a new hold, as it were, relative to the arm 792, ready to again force it upward as soon as its obstruction is removed. The movements dependent upon the continuous revolution of the cam 623, above described, are repeated for every word in the line and until the operation of the line-clutch has taken place. The cam 795 disengages the pawl 618 from the sector 691 to allow the lifting-blade 200 to return to its starting-point after said blade has performed its appointed work and sent the last word thereon through the opening 561 into the cut-off channel 521. The action of the cams 795 and 784 at this time is not quick enough to clear the continuous-line action of the word-shaft 600. Hence the arm 614 with attached pawl 618 are rocked forward by the projecting portion of the cam 623, thereby permitting said pawl to make a new engagement with the sector 791 preparatory to a repetition of the previously-described movements of these and their coacting parts. The blade 200 enters the opening 521 a distance only equal to the thickness of the space knock-off plate 559 in order to elevate the last word onto a level with the top of said plate, and it is returned downward by the rotation of the cam 784 in time to clear the action of the word-cut-off mechanism, described below. It is now necessary to cut out each word from the ascending type-line in the line-feed channel, shift it into the galley-feed channel, and at the same time remove the separators from between the words. These two steps in the operation of my machine are accomplished simultaneously and automatically by means of a movable channel-arm and knock-off plate, both actuated by power transmitted from the word-shaft. A description of the special form of construction for the word and space-actuating mechanism employed in this machine will now be given.

As already stated, the channel 183 is approximately the size of the type 121$^a$ and also the temporary space or separator 152, allowing both to slide freely therein. The movable channel-arm 546 is pivoted to the frame A at 552 and terminates in front in the cut-off channel-block 550. The arm 562, which terminates in front in the knock-off plate 559, is pivotally mounted to the frame A at 560, and said plate is provided with the front opening 561, corresponding exactly in size with the channel 183 and located in alinement therewith when in its position to the right; but it may be moved to the left beyond the right wall of said channel. The thinner front end of said knock-off plate is constructed approximately the same thickness as the separators 152. The block 550 with the plate 542 forms the cut-off or galley-feed channel 521, and said block has the wards 522 and 523 projecting to the left into said channel, said wards corresponding in depth and distance apart with the nicks 150 and 151 in the type 121$^a$. These wards present an obstruction to the advancement of the line of type 121ᵃ as soon as a separator 152 comes in contact therewith. When said obstruction takes place, the channel 521 moves to the right out of alinement with the channel 183 and into alinement with the opening at the top of the collector-box 473. This movement is produced by the cam 602, the roller 553 on the bottom of the extension 555 from the arm 546 being engaged by the groove in said cam. The arm 562 has the roller 558 extending upward into engagement with the groove in the cam 607 and the rotation of said cam produces a movement to the left of the knock-off plate 559 simultaneous with the movement of the channel 521 in the opposite direction. The plate 559 carries with it the separator 152, which was inclosed in the opening 561, to a position above the opening 564 at the left of the channel 183 and allows said separator to drop therein by gravity. A suitable funnel-shaped tube or receptacle may be provided to receive the separators 152 as they are removed from the line by the plate 559. The cams 602 and 607 return the plate 559 and the channel 521 to alinement with the channel 183 after the separator 152 has been expelled and the proper space value introduced in place thereof beneath the bottom word in said channel.

The mechanism for collecting and inserting the proper space values in the type-line after they have been selected and removed from the space-channels by the space-collecting device and coacting parts comprised means for engaging in turn the different sizes of individual spaces, taking the required number of one or more of said sizes, piling them up, conveying the pile so collected to its locality in the line and there depositing the same.

The space-collector 470 consists of a block reciprocated in a suitable guideway beneath the space-channels 123 and the cut-off channel 521, by means of the arm 412 and the cam 608 on the word-shaft 600. The rear end of the arm 412 is pivoted at 411 to a projection from the right-end bracket of the machine and the bar 410 connects the front end of said arm with the right-hand end of the collector 470. The roller 471 on the top of the arm 412 midway between its ends enters the groove in the cam 608. The collector 470 is provided with the box 473, opening through the top thereof, in which the false bottom 472 operates vertically. The false bottom gage-bar 460 is mounted in slide-bearings provided for that purpose in the rear of the space-channels 123 and has the rearwardly-extending bracket 463 near its base, in which the shaft 464 is journaled. The rollers 401 and 403 are mounted on opposite ends of the shaft 464. The buffer-slide 466 is located on the front of the bar 460 and attached thereto in such a manner that a limited amount of independent motion between the two is possible. The spring 474 is fastened at its upper end to the slide 466 and at its lower end to the bottom bearing for the bar 460. Reciprocally mounted on the bar 460 above the slide 466 is the block 465, recessed to receive the spring 475. The spring 474 serves to tension the slide 466 and the bar 460 downward with one or both of the rollers 401 and 403 bearing against the members below, while the spring 475, which is interposed between the top of said slide and the block 465, tensions the latter upward. The pin 467 projecting from the front face of the bar 460 limits the extreme upward movement of the block 465. The top of the oscillating arm 468 is pivoted at 469 to the upper part of the block 465, and the base of said arm is pivoted at 477 to the false bottom 472 in the collector 470, an opening being provided in the supporting frame members for that purpose. A depending lug on the right end of the collector 470 has threaded therein the set-screw 478, which is adapted to strike the end of the collector guideway and prevent the head of said collector from forcibly coming in contact with the right wall of the channel 183.

The operation of the space-collecting members is described as follows: While the forms 400 are at the extreme right end of their adjustment the blank form 406 is beneath the roller 401 and renders the collector 470 inoperative, so far as the spaces in the channels 123 are concerned, by retaining the top of the false bottom 472 on a level with the upper surface of said collector during the passage of the latter under said channels, through the medium of the intervening mechanism, thereby preventing any of said spaces from entering the box 473. In order to bring about this result and those obtained when one or another of the forms 400 is beneath the roller 401, it is necessary that the shaft 421 should be geared to revolve at the same speed as the word-shaft 600 and said forms cut away to lower the false bottom 472 for distances corresponding to the heights of space values needed from the channels 123 containing the same, said forms being timed to coöperate with the cam 608, which locates said false bottom under said channels. During the time that the forms 400 are being adjusted for selecting the required spaces the roller 401 is raised out of their path by the adjusting-cam 402 under the roller 403 and the false bottom 472 is held in its highest position by said cam until carried by the collector 470 to the right-hand starting-point immediately below the right-hand channel 123. Assuming that the measuring device has located the particular form 400 which represents the space value wanted under the roller 401, the movements of the several coacting parts is now set forth. The cam 608 causes the collector to pass beneath the channels 123, pausing for an instant below each in turn, and at the same time the selected form 400 is performing its revolution beneath the roller 401, which is permitted to ride upon said form, since the high part of the cam 402 has turned from beneath the roller 403. When the roller 401 descends into a depression in the periphery of the form 400, under the influence of the spring 474, the slide 466 and the bar 460 are drawn down accordingly, and the pin 467 on said bar carries down with the latter the block 465, the arm 468, and the false bottom 472. The number of spaces in the particular channel 123 beneath which the box 473 is located at the time the roller 401 entered the depression in the form 400, that corresponds with said depression, drops into said box onto the false bottom 472. If spaces of another size are required to complete the space value wanted, the roller 401 enters a still deeper depression in the form 400 and depresses the false bottom 472 accordingly, beneath another of said space-channels. The individual spaces now piled up in the box 473 constitute the requisite space value and the collector continues its movement to the left until it arrives under the cut-off channel 521, which now occupies its position at the right. The peculiar shape of the arm 468 and its pivotal connections enable the same to swing to the left and still keep the false bottom 472 in its last-placed position. Upon arriving beneath the channel 521 the false bottom 472 raises the space value in the box 473 into said channel beneath the word or words contained therein, and said channel moves again to the left, taking said space value with it, while said collector returns to the right for a duplicate of the space value. These operations continue until the line has been justified. The false bottom 472 is raised to deposit the space value in the channel 521, by means of the cam 402, which now elevates the bar 460 and connected parts, but forcing said bar and the slide 466 against the spring 475 farther than the arm 468 permits the block 465 to move while occupying its present position, the latter being now separated from the pin 467. The separation just referred to enables the arm 468 to swing back to the right when the collector 470 returns, with the false bottom 472 in its elevated position, the spring 475 closing up said separation until the block 465 encounters the pin 467 at the end of the collector's return travel. The roller 401 is held out of the way of the forms 400 by the cam 402 and the roller 403 at the time said forms are actuated into their initial position at the completion of the line-justification.

The construction and operation of the different space-selecting forms will be clearly understood from Figs. 25 to 38 and the following description, and from this sets of space-selecting forms can readily be calculated for using any number of spaces desired. The space-forms illustrated are made on a system in which the space values are made up from spaces of three sizes, and only the three right-hand space-channels are used in this system, although four space-channels are shown in the machine, the fourth left-hand channel being left without spaces.

In the system illustrated the three spaces differ from each other by six one-thousandth of an inch, the smallest, or No. 1 space, being eighteen one-thousandths in thickness, the No. 2, or next larger space, being twenty-four one-thousandths in thickness, and the No. 3, or largest space, being thirty one-thousandths in thickness.

As shown in Figs. 25 to 38, there are ten space-selecting forms, numbered, respectively, $400'$ to $400^{10}$, which are carried by the sleeve 407 on shaft 421 between the blank form 406 and the holding-nut 499, these space-selecting forms being shown in their correct relative positions on the shaft in Figs. 28 to 37, it being understood that the forms rotate with shaft 421 to the right in these figures, as shown by the arrows.

Figure 38:
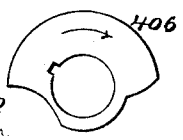

As stated above and as shown in Fig. 38, the blank form 406 has a continuous surface which holds up the roller 401, so as to raise the top of the false bottom 472 and prevent any of the spaces from entering the box 473 as the collector moves below the spaces. Each of the space-selecting forms $400'$ to $400^{10}$ has a portion of its operative surface on the same level as the surface of blank form 406, so as to hold the false bottom 472 on a level with the upper surface of the collector and prevent spaces being taken during a part of the movement of the collector and a portion or portions of its operative surface on a lower level, so as to permit the false bottom 472 to drop and the collector to take a space from one or more of the space-channels as it moves below the channels.

The operative surface of each of the forms, therefore, is really divided into four segments, the first segment being on the same level as the surface of blank form 406 and being under the roller 401 during the movement of the collector into position below the No. 1 space-channel and the other segments corresponding to the position of the collector under the No. 1, No. 2, and No. 3 space-channels, and each of these three segments being on the same level as the first segment or cut away to a lower level, according to the spaces to be taken. Each of the space-selecting forms, as well as the blank form 406, also has a rounded cut-away portion $x$, which provides for the adjustment of the forms along the roller 401, which roller is out of contact with the forms when opposite this cut-away portion $x$.

The action of the different space-selecting forms in lowering the false bottom 472 by permitting the roller 401 to drop during the rotation of one of the forms in contact with the roller, so as to select the proper spaces to make up the required space value, will be readily understood from Figs. 28 to 37 in connection with the following table, showing the spaces taken by the collector under the control of each of these forms and the space values thus made up.

| Forms. | Spaces. | Space values in thousandths inch. |
|---|---|---|
| 400' | No. 1 | 18 |
| 400² | No. 2 | 24 |
| 400³ | No. 3 | 30 |
| 400⁴ | 2 No. 1 | 18+18=36 |
| 400⁵ | No. 1; No. 2 | 18+24=42 |
| 400⁶ | 2 No. 2 | 24+24=48 |
| 400⁷ | No. 2; No. 3 | 24+30=54 |
| 400⁸ | 2 No. 3 | 30+30=60 |
| 400⁹ | 2 No. 1; No. 3 | 18+18+30=66 |
| 400¹⁰ | No. 1; No. 2; No. 3 | 18+24+30=72 |

I will now describe the upper galley devices, which consist of the means for receiving an advancing line of type and, when said line is complete, of transferring it from the knock-off plate upon which the last word of the line rests into the galley. A receiving-channel with its movable wall having a reciprocal relation with the other parts is employed for the purpose specified above, as will appear from the following explanation.

The complete type-line is now in the upper section of the line-channel, called the "galley-feed" channel, 521, which consists of the pusher-block 550 and movable plate 542, as hereinbefore stated. The movable channel-plate arm 540 is pivoted to the frame A between the pivotal points 552 and 560, the same pin serving for the three arms 546, 562, and 540, and said first-mentioned arm extends forward to the rear of the block 550. The plate 542 is held longitudinally immovable by the spring-actuated pin 543, projecting from the hub 544 into an opening in said plate. The hub 544 projects from the right face of the arm 540 and an opening is provided in the arm 546 to receive the end of said hub and permit the same to pass through when said arm 546 is forced toward said arm 540. The plate 542 and the block 550 on the arm 540 and 546, respectively, are normally separated to form the channels 521 by means of the flat stiff spring 533 and the bolt 530, the end of said arm 540 serving as the bottom of said channel. The bolt 530 passes through a hole in the arm 546 and is threaded into the arm 540, and the spring 533 is rigidly attached to the first of said arms and bears against the second, thrusting it away from the former as far as the head of said bolt will permit. The plate 542 is so connected to the arm 540 as to have a longitudinal movement thereon. The arm 539 is rigidly connected with the arm 536 by the stud 739, which has its bearing in the frame A, and said first-mentioned arm has the roller 541, engaging the surface cam 735 on the line-shaft 700. The lever 727 is pivoted at 728 to a left-hand extension from the middle frame-bracket, and has the roller 726 on its rear end engaged by the cam 797 on the shaft 700. The front end of the lever 727 is bifurcated and provided with the rollers 547 547, which register with the groove 534 in a prolongation of the cam 602. The cam 607 is tight on the word-shaft 600, while the cam 602 is loose on said shaft and receives its rotary motion from said cam 607, ordinary clutch or interlocking teeth being provided on adjacent faces of said cams to allow them to be engaged or disengaged. When the cam 602 is actuated to the left away from the cam 607 in the manner noted below, the first cam ceases to revolve and remains idle until returned into engagement with the second cam. The line-shaft 700 rotates at the proper time for the operation of the parts comprised in the galley-feed mechanism, which operation will next be explained. The rotation of the cam 797 actuates the front end of the lever 727 and the cam 602 to the left and the arms 546 and 540 are moved in the same direction, since said arm 546 is operatively connected with said cam by the extension 555 and the roller 553. Upon the movement to the left of the cam 602 on the shaft 600 the plate 542 comes into contiguity with the galley-rule 538 and the fixed pin 545 forces the pin 543 to the right, thus unlocking said plate from the arm 540. The cam 797 and connecting members draw back the rule 538 with the plate 542 now connected to said rule by the pin 545 until the front edge of said plate, which extends over the front edge of said rule, is flush with the bottom of the galley b. At this instant the arm 546 is forced still farther to the left by the cam 797, carrying the block 550 past the end of the arm 540 and of the plate 542, against the resiliency of the spring 537, and deposits the type-line in the galley b. During the collapse of the channel 521 the front end of the arm 540, the plate 542, rule 538, and the end of the galley-abutment are in contiguity, one with another, and the movement of said arm to the left is limited by said abutment and the intervening members. The continuation of the rotation of the cams 797 and 735 returns the displaced members and restores the channel 521.

The final action of my machine inserts a lead into the column on the galley b, and the performance takes place or results from the return of the rule 538 to its forward position by the cam and arm governing the same. Below or back of the bottom of the galley b is the lead-receptacle 570, in which is the package of leads 153, under a constant pressure to the right by the cylindrical plungers 571, said plungers being actuated by the coiled springs 572. The latches 573 are inserted in small pockets in the right end of the galley-bottom and are under the constant tension of the spiral springs 574. The front side of each latch 573 is flush with said bottom, and its rear side is beveled. The rule 538 has the offset 575 in its front terminal, also flush with said bottom. When said rule is withdrawn to the rear, the springs 574 force the latches 573 beneath the adjacent lead and the spring-actuated plungers 571 force the right-hand lead in the receptacle 570 against said rule, with the rear edge of said lead on the offset 575. After the type-line has been shifted onto the galley b the rule 538 returns, as before explained, carrying with it the lead on said offset, forcing to the left the latches 573 until the parts stand as shown in Fig. 24. Only one latch and plunger are shown in Fig. 24, the others being directly beneath the corresponding members illustrated.

While the machine shown as embodying the invention is adapted for handling ordinary type and I have aimed especially at the production of a machine capable of justifying such type at high speed with accuracy and a minimum of wear on the type, it will be understood that the invention is not limited to machines for justifying such ordinary type, but may be applied also in justifying type, matrices, or the like of any suitable material, and the word "type" is used in this specification and the claims in this broad sense. The broad features of the invention also are applicable not only in machines for justifying composed lines of type, matrices, and the like, but in justifying mechanism for all kinds of composing-machines.

What I claim as my invention, and desire to secure by Letters Patent, is—

1. In an automatic type-justifying machine, the combination of a justifying-space-computing device dependent upon an adjustment for the amount of shortage and an adjustment for the number of intervals in the line of type being justified, and a series of forms having suitable dimensions for determining the spaces needed to make up the required space values.

2. An automatic type-justifying machine provided with a computing device dependent upon an adjustment for the amount of shortage and an adjustment for the number of intervals in the line of type, and a series of forms having suitable dimensions for selecting the spaces needed, with means to adjust said forms to make up each required space value designated by the computing device.

3. An automatic type-justifying machine provided with a computing device dependent upon an adjustment for the amount of shortage and an adjustment for the number of intervals in the line of type, and a series of forms for selecting the spaces needed to make up the required space values, with a channeled device for successively collecting the words of the line, the space values selected by the computing device and the forms, and for depositing the line on the receiving-galley.

4. An automatic type-justifying machine provided with a computing device, a gage for determining the remainder, and a series of forms controlled by said computing device and gage for directing the selection and the appropriation of the spaces required for each space value designated by the computing device.

5. An automatic type-justifying machine provided with a computing device, a gage for determining the remainder, and a series of forms for directing the selection and the appropriation of the spaces required for each space value designated by the computing device, with means for causing the remainder-gage to change said forms.

6. An automatic type-justifying machine provided with a computing device, a gage for determining the remainder, a series of forms for directing the selection and the appropriation of the spaces required for each space value designated by the computing device, and two controller devices one for directing the action with regard to the number of each size of space values needed and the other to direct the action on successive lines in accordance with the number of words in each line.

7. In a type-justifying machine, in combination, a line-clamp, a movable word-cut-off channel, and means between the two ends of the jaws of said clamp yielding to allow one jaw to move transversely to the line with the cut-off channel.

8. The combination with a type-channel, of a line-clamp and means between the two ends of the clamp yielding to allow one end of the clamp to move transversely to the line while retaining pressure on the end of the line.

9. In a type-justifying machine, in combination, a line-clamp, a yielding means between the two jaws of said clamp, a movable channel, means to cause said channel to deposit the line on the galley, and a guide for the upper jaw of said clamp whereby the latter returns outside of said channel, for the purpose set forth.

10. In a type-justifying machine, in combination with a line-channel and a line-shifting plate, operating transversely to said channel, of a member actuated thereby adapted to forcibly bear on the end of the type-line, for the purpose set forth.

11. In a type-justifying machine, the combination with a series of channels and a line-lifting blade, of a hooked member adapted to forcibly bear on the top of the type-line and follow it from channel to channel, for the purpose set forth.

12. In a type-justifying machine, in combination, a line-lifting plate, a series of channels, a line-lifting blade, an arm actuated by said plate adapted to forcibly bear on the top of the type-line, and a hooked member arranged to be engaged with and disengaged from said arm, to forcibly bear on said type-line and follow it in its upward course, for the purpose set forth.

13. In a type-justifying machine, the combination with a type-channel and a hooked member, of an arm provided with a finger adapted to engage and disengage said hooked member, means for operating said finger, and means for actuating said arm forcibly against the end of a type-line, for the purpose set forth.

14. In a type-justifying machine, the combination with a type-channel, of a clamping-rod pivotally mounted and provided with a hook adapted to forcibly bear on the top of a type-line and follow it in its upward course, and means for reciprocating said rod, for the purpose set forth.

15. In a type-justifying machine, the combination with a vibrating clamping-arm and a type-channel, of a clamping-rod pivotally attached to the blade-mounting block and provided with a hook adapted to forcibly bear on the top of a type-line and follow it in its upward course, means for engaging and disengaging said hook and said arm, and means for reciprocating said rod, for the purpose set forth.

16. In a type-justifying machine, in combination with the space-counting device, a controller, means for actuating said controller, and a trip between the word-shaft and the line-shaft, operated by said controller, whereby motion is transmitted from said first-mentioned shaft to said line-shaft or discontinued, for the purpose set forth.

17. In a type-justifying machine, in combination with the space-counting device, a clutch between the word-shaft and the line-shaft, a controller, a trip, and means for actuating said controller and introducing said trip into and out of said clutch, for the purpose set forth.

18. The combination with the line mechanism of a justifying-machine, of a space-counting device and a controller for controlling the line mechanism in accordance with the action of the space-counting device.

19. In a type-justifying machine, in combination with the remainder-computing device, wedge-blocks rendered separable by said device, a wedge, and a space-value controller adapted to tightly force said wedge between said blocks, for the purpose set forth.

20. In a type-justifying machine, in combination with the space-counting device and the remainder-computing device, controllers for directing the machine in accordance with the number of space intervals and the remainder, and means for continuing the operation of said machine in accordance with the direction so given it, for the purpose set forth.

21. In a type-justifying machine, in combination with the remainder-computing device, wedge-blocks rendered separable by said device, a wedge, a plurality of space-value forms, and a space-value controller adapted to tightly force said wedge between said blocks and reciprocating said forms in proportionate relation to the separation of said wedge-blocks, for the purpose set forth.

22. In a type-justifying machine, in combination, a computing-bar, a notched reciprocating controller-rod adapted to engage said bar at the proper time, engaging members governed by a trip, a lifting-bar, an arm for depressing said rod, and a clutch-trip operated by said rod and coacting parts, for the purpose set forth.

23. In a type-justifying machine, in combination, a space-value locating-rod, a notched reciprocating space-value controller-rod, engaging members governed by a trip, a lifting-bar, an arm for depressing said rod, a line-measuring rod provided with wedge-blocks, a wedge adapted to be forced between said blocks, and a trip arranged to operate said locating-rod by said controller-rod, for the purpose set forth.

24. In a type-justifying machine, in combination, two similar notched reciprocating rods, engaging members governed by a trip, a lifting-bar, arms for depressing said rods, a counting-bar for limiting the downward movement of one of said rods, a clutch-trip operated by the same rod, a space-value locating-rod, a line-measuring rod provided with wedge-blocks, a wedge adapted to be forced between said blocks, and a trip arranged to operate said locating-rod by the other of said similar rods, for the purpose set forth.

25. In a type-justifying machine, in combination with the line-lifting rod, a vibrating stop member normally grasping said rod, and means for releasing the same from said member, for the purpose set forth.

26. In a type-justifying machine, in combination with the line-lifting rod, a vibrating stop member normally grasping said rod, and word-cut-off channel members adapted to actuate said stop member and release said rod, for the purpose set forth.

27. In a type-justifying machine, in combination, a line-lifting rod, a hooked arm in operative relation thereto, word-cut-off channel members, and means adapted to coincidently actuate said members and vibrate said arm, thereby releasing said rod, for the purpose set forth.

28. In a type-justifying machine, in combination, a series of space-channels, a package of space-value forms, a space-value-computing device and connections between said computing device and forms for adjusting said forms to the right and left of said channels, a reciprocating space-collector between said forms and channels, and means for inserting the spaces collected, into the type-line, for the purpose set forth.

29. In a type-justifying machine, in combination, a movable type-line channel, a series of space-channels, a package of space-value forms, means for adjusting said forms to the right and left of said channels, a reciprocating space-collector between said forms and channels, and means for inserting the spaces collected, into the line in said movable channel, for the purpose set forth.

30. In a type-justifying machine, in combination, a series of space-channels, a package of space-value forms, a space-locating device for locating said forms relative to said channels, a space-collector between said forms and channels, means for reciprocating said collector to a position correlative with said forms, and means for inserting spaces collected, into the type-line, for the purpose set forth.

31. In a type-justifying machine, in combination with a series of space-channels, a package of space-value forms, a space-value-computing device for locating said forms relative to said channels, a space-collector between said forms and channels, a false bottom in said collector, and means operated by the selected space-value form for depressing said bottom, for the purpose set forth.

32. In a type-justifying machine, in combination, a line-channel having one side movable to permit a line to be moved transversely out of the channel, a galley-rule, means for operating said rule, means for connecting the movable wall of said line-channel to said galley-rule, and means for disconnecting said wall from said channel whereby the former is displaced by said rule, for the purpose set forth.

33. In a type-justifying machine, in combination with a type-line-lifting device, cut-off channel members, and means for transforming said members into a galley line-pusher, for the purpose set forth.

34. In a type-justifying machine, in combination with a type-line support, transversely-movable members forming a channel, and a longitudinally-movable member arranged to disengage one of said transversely-movable members and convert it into a longitudinally-movable member, for the purpose set forth.

35. In a type-justifying machine, in combination with a type-line support, word-cut-off channel members, means for collecting cut-off words therein to form a line, and means for transforming said members into a galley line-pusher.

36. In a type-justifying machine, in combination, transversely-movable arms carrying a channel-block and a channel-plate respectively, and a longitudinally-movable rule adapted to be removed with said plate from the path of said block, for the purpose set forth.

37. In a type-justifying machine, in combination, transversely-movable arms carrying a block and a plate respectively, means for locking said plate in position to form a channel-wall with said block, a longitudinally-movable rule adapted to be removed from the path of said block, and means for unlocking said plate and removing it with said rule, for the purpose set forth.

38. In a type-justifying machine, in combination with a type-line-lifting device and a support for said line, an arm provided with a block, a second arm carrying a plate, means for locking the latter in position to form a channel with said block, a rule, means for unlocking said plate and removing it with said rule from the path of said block, and means for actuating said arms and moving said block over the path of said rule and plate, for the purpose set forth.

39. In a type-justifying machine, in combination with a receiving-galley having a receptacle for holding a package of leads, a reciprocating rule forming one end of said receptacle, a member or members in said receptacle arranged to force a lead from said package into contact with said rule whereby the former is conveyed into the type-line column, and a spring-actuated latch or latches interposed in the path of said lead whereby the same is prevented from returning into said receptacle, for the purpose set forth.

40. In a type-justifying machine, in combination with the remainder-computing device, a controller, and a difference-trip operated by said controller in accordance with the remainder, for the purpose set forth.

41. In a type-justifying machine, in combination with the space-counting device and the remainder-computing device, a clutch between the word-shaft and the line-shaft, a clutch-trip, a difference-trip, and two similar controllers for operating said trips in accordance with the operation of said devices, for the purpose set forth.

42. In a type-justifying machine, in combination, a computing-bar, a counting-bar connected to said computing-bar, a reciprocating controller-rod adapted to have its movement in one direction limited by the positions of said bars, and means for returning said rod to its starting-point, for the purpose set forth.

43. In a type-justifying machine, in combination, a computing-bar, a counting-bar connected to said computing-bar, a notched reciprocating controller-rod adapted to have its movement in one direction limited by the positions of said bars, and a lifting-bar and engaging members governed by a trip for returning said rod to its starting-point, for the purpose set forth.

44. In a type-justifying machine, in combination, a computing-bar, a counting-bar connected to said computing-bar, a notched controller-rod adapted to have its movement in one direction limited by the positions of said bars, a lifting-bar and engaging members governed by a trip for returning said controller-rod to its starting-point, an arm for depressing said rod, and a clutch-trip operated by said rod and coacting parts, for the purpose set forth.

45. In a type-justifying machine, in combination, a space-value locating-rod, a line-measuring rod provided with wedge-blocks, a wedge arranged to enter between said blocks, a reciprocating space-value controller-rod adapted to have its movement in one direction limited in accordance with the amount of separation of said blocks by said wedge, and means for returning said controller-rod to its starting-point, for the purpose set forth.

46. In a type-justifying machine, in combination, a space-value locating-rod, a line-measuring rod provided with wedge-blocks, a wedge arranged to enter between said blocks, a notched reciprocating space-value controller-rod adapted to have its movement in one direction limited in accordance with the amount of separation of said blocks by said wedge, and a lifting-bar and engaging members governed by a trip for returning said controller-rod to its starting-point, for the purpose set forth.

47. In a type-justifying machine, in combination, a space-value locating-rod, a line-measuring rod provided with wedge-blocks, a wedge arranged to enter between said blocks, a notched reciprocating controller-rod adapted to have its movement in one direction limited in accordance with the amount of separation of said blocks by said wedge, a line-lifting bar and engaging members governed by a trip for returning said controller-rod to its starting-point, an arm for depressing said controller-rod, and a trip arranged to operate said locating-rod by said controller-rod, for the purpose set forth.

48. In a type-justifying machine, in combination, a counting-bar, a controller-rod adapted to have its movement in one direction limited by the position of said bar, a line-measuring rod provided with wedge-blocks, a wedge arranged to enter between said blocks, a second controller-rod adapted to have its movement in one direction limited in accordance with the amount of separation of said blocks by said wedge, and means for returning said controller-rods to their starting-point, for the purpose set forth.

49. In a type-justifying machine, in combination, a counting-bar, a notched reciprocating controller-rod adapted to have its movement in one direction limited by the position of said bar, a line-measuring rod provided with wedge-blocks, a wedge adapted to enter between said blocks, a second controller-rod adapted to have its movement in one direction limited in accordance with the amount of separation of said blocks by said wedge, and a line-lifting bar and engaging members governed by a trip for returning said controller-rods to their starting-point, for the purpose set forth.

50. In a type-justifying machine, in combination, a series of space-channels, a plurality of rotating space-value forms, and means for adjusting said forms to the right and left of said channels, for the purpose set forth.

51. In a type-justifying machine, in combination, a series of space-channels, a plurality of rotating space-value forms, means for adjusting said forms to the right and left of said channels, and a reciprocating space-collector between said forms and channels, for the purpose set forth.

52. In a type-justifying machine, in combination with a series of space-channels, a plurality of space-value forms, a space-value-computing device for locating said forms relative to said channels, a space-collector between said forms and channels, a false bottom in said collector, means for depressing said bottom in accordance with the configuration of the selected form, and means for elevating said bottom again, for the purpose set forth.

53. In a type-justifying machine, in combination with a series of space-channels, a reciprocating space-collector in operative relation with said channels and a series of rotating space-value forms, for the purpose set forth.

54. In a type-justifying machine, in combination with a series of space-channels, a space-collector in operative relation with said channels, means for bringing said collector and channels into position for the transfer of spaces from the channels to the collector, a series of space-value forms, and means for positioning the forms after the spaces are collected from one channel to determine how many spaces shall be taken from the next channel.

55. In a type-justifying machine, in combination with a series of space-channels, a reciprocating space-collector provided with a movable bottom, in operative relation with said channels, and a series of rotating space-value forms for positioning said bottom, for the purpose set forth.

56. In a type-justifying machine, in combination with a series of space-channels, a space-collector provided with a false bottom, in operative relation with said channels, means for reciprocating said collector, and a series of space-channel forms for actuating said bottom movable after spaces are collected from one channel to position the bottom for taking spaces from the next channel.

57. In a type-justifying machine, in combination, a series of space-channels, a line-receiving channel, and a space-collector adapted to receive and convey space values from said space-channels to said line-channel and a series of rotating space-value forms, for the purpose set forth.

58. In a type-justifying machine, in combination, a series of space-channels, a line-receiving channel movable toward and from the space-channel, and a space-collector adapted to receive and convey space values from said space-channel to said line-channel, for the purpose set forth.

59. In a type-justifying machine, in combination, a series of space-channels, a line-receiving channel movable toward and from the space-channels, and a space-collector provided with a movable bottom adapted to receive space values from said space-channels and introduce them into said line-channel, for the purpose set forth.

60. In a type-justifying machine, in combination, a series of space-channels, a line-receiving channel, a space-collector provided with a false bottom, means for reciprocating said collector between said space-channels and said line-channel, and a series of rotating space-value forms for actuating said bottom for the reception of space values from said first-mentioned channels and for the introduction of the same into said line-channel, for the purpose set forth.

61. In a justifying mechanism, the combination with a computing device for computing justifying-space values from the shortage of the line and the number of intervals, of a series of forms controlled by said computing device for forming said space values.

62. In a justifying mechanism, the combination with a computing device for computing justifying-space values from the shortage of the line and the number of intervals, of a series of space-channels, and a series of forms controlled by said computing device for selecting spaces to make up said space values.

63. In a type-justifying mechanism, the combination with means for measuring a composed line of type and computing justifying-space values for the line, of a series of forms controlled by said computing means for forming said space values, and means for inserting said space values in the line.

64. In a type-justifying mechanism, the combination with means for measuring a composed line of type and computing justifying-space values for the line, of a series of forms controlled by said computing means for forming said space values.

65. The combination with a reciprocating word-collecting member, of means for giving said member a further movement to transfer the line.

66. The combination with a reciprocating word-collecting member, and means for inserting justifying-spaces, of means for giving said member a further movement to transfer the justified line.

67. The combination with a member having a movement for each word of a line, of means for giving said member a line movement for each line.

68. The combination with a member having a movement for each word of a line, of a power-shaft and positively-acting connections for giving said member a line movement for each line.

69. The combination with a continuously-rotating word-shaft, of a word-cam on said shaft, an intermittently-rotating line-shaft, and connections by which the word-cam is released from the word-shaft and actuated by the line-shaft to produce the line movement.

70. The combination with a continuously-rotating word-shaft, of word-movement devices actuated by said shaft, a line-shaft, and means for releasing the word-movement devices from the word-shaft and operating them by the line-shaft for the line movement.

71. In a clutch for type-justifying machines, in combination, a double-grooved word-cam, a line-cam reciprocally mounted on the line-shaft, an idler driven by the word-shaft mechanism, a swinging arm operatively engaging said word-cam and adapted to actuate said line-cam into conjunction with said idler and to release the same, whereby power is intermittently transmitted from said word-shaft mechanism to said line-shaft, for the purpose set forth.

72. In a clutch for type-justifying machines, in combination, a double-grooved word-cam, a line-cam reciprocally mounted on the line-shaft, an idler driven by the word-shaft mechanism, a swinging-arm, means for engaging one end of said arm with either of the grooves in said word-cam whereby the opposite end of said arm actuates said line-cam into conjunction with said idler and releases the same, and means to disengage said last-mentioned cam from said idler at the completion of the line-shaft revolution, for the purpose set forth.

73. In a clutch for type-justifying machines, in combination with a swinging arm adapted to engage and release a line-cam, a word-cam provided with two grooves, a cam on the periphery of said word-cam, a vibrating trip pivotally connected to said arm and arranged to actuate its roller from one of said grooves into the other when under the influence of said peripheral cam, and a projection for returning said roller to the first of said grooves; for the purpose set forth.

74. In a clutch for type-justifying machines, in combination, a swinging arm actuated by a word-cam and adapted to engage and release a line-cam, an idler driven by the word-shaft mechanism capable of imparting motion to said line-cam when the latter is forced into conjunction therewith by said arm, a post extending into the groove in said line-cam to hold the same in engagement with said idler during a part of its revolution, and a cam-spring on said line-cam arranged to bear on said post and actuate said last-mentioned cam out of engagement with said idler at the end of the line-shaft revolution, for the purpose set forth.

75. In a clutch for type-justifying machines, in combination, a toothed idler loose on the line-shaft and driven by the word-shaft mechanism, a grooved cam reciprocally mounted on said line-shaft capable of interlocking with said idler, means for connecting the interlocking members, a post extending into the groove in said cam to hold the same in engagement with said idler during a part of its revolution, and a cam-spring on said line-cam arranged to bear on said post and disconnect said members at the end of the line-shaft revolution, for the purpose set forth.

76. In a type-justifying machine, in combination, a feed-channel, a cut-off channel, a line-lifting blade operating in said feed-channel, means dependent upon the line-shaft for actuating said blade, other means dependent upon the word-shaft for actuating said blade, a ward or wards in said cut-off channel to check an advancing type-line on said blade, and a ratchet-sector and engaging pawl between said line and word actuated means, whereby said line is intermittently transferred from one of said channels into the other, for the purpose set forth.

77. In a type-justifying machine, in combination, a feed-channel, a cut-off channel, a line-lifting blade operating in said feed-channel, line-actuated positive means for returning said blade to its initial position, and word-actuated means dependent upon a ratchet-sector and a pawl for moving said blade from said initial position, for the purpose set forth.

78. In a type-justifying machine, in combination, a feed-channel, a cut-off channel, a line-lifting blade operating in said feed-channel, a ward or wards in said cut-off channel to check an advancing type-line on said blade, line-actuated positive means for returning said blade to its initial position, and word-actuated intermittent means dependent upon a ratchet-sector and a pawl for moving said blade and line from said initial position, for the purpose set forth.

BENJ. M. DES JARDINS.

Witnesses:
 Eva S. Shelton,
 T. A. Cutter.